(12) United States Patent
Fujisawa

(10) Patent No.: US 9,571,687 B2
(45) Date of Patent: Feb. 14, 2017

(54) IMAGE FORMING APPARATUS AND RESOURCE MANAGEMENT METHOD

(71) Applicant: CANON KABUSHIKI KAISHA, Tokyo (JP)

(72) Inventor: Kunimasa Fujisawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/820,715

(22) Filed: Aug. 7, 2015

(65) Prior Publication Data
US 2016/0044201 A1 Feb. 11, 2016

(30) Foreign Application Priority Data
Aug. 8, 2014 (JP) .................. 2014-163049

(51) Int. Cl.
*H04N 1/00* (2006.01)
*G06K 1/00* (2006.01)

(52) U.S. Cl.
CPC ........ *H04N 1/00954* (2013.01); *H04N 1/0096* (2013.01); *H04N 2201/0094* (2013.01)

(58) Field of Classification Search
CPC .................................................. H04N 1/00954
USPC ................ 358/1.9, 1.15, 1.6, 1.16, 523, 524
See application file for complete search history.

(56) References Cited

U.S. PATENT DOCUMENTS

| 2005/0046887 A1* | 3/2005 | Shibata ............. H04N 1/00204 358/1.13 |
| 2006/0061809 A1* | 3/2006 | Murataka .................. G06T 1/00 358/1.15 |
| 2013/0185712 A1* | 7/2013 | Osada ....................... G06F 8/61 717/174 |

FOREIGN PATENT DOCUMENTS

| JP | 2005-269439 A | 9/2005 |
| JP | 2013-145503 A | 7/2013 |

* cited by examiner

*Primary Examiner* — Quang N Vo
(74) *Attorney, Agent, or Firm* — Carter, DeLuca, Farrell & Schmidt, LLP

(57) ABSTRACT

A maximum resource use amount for use by an application is acquired for each application, the acquired maximum resource use amount and a resource amount used by the applications are stored for each application, and when an application calls a resource use API in order to acquire or release a resource, it is determined, based on the upper limit of the used resource amount and the used resource amount, whether or not to generate the resource, and, if it is determined to generate the resource, the resource is generated and the used resource amount is updated.

11 Claims, 29 Drawing Sheets

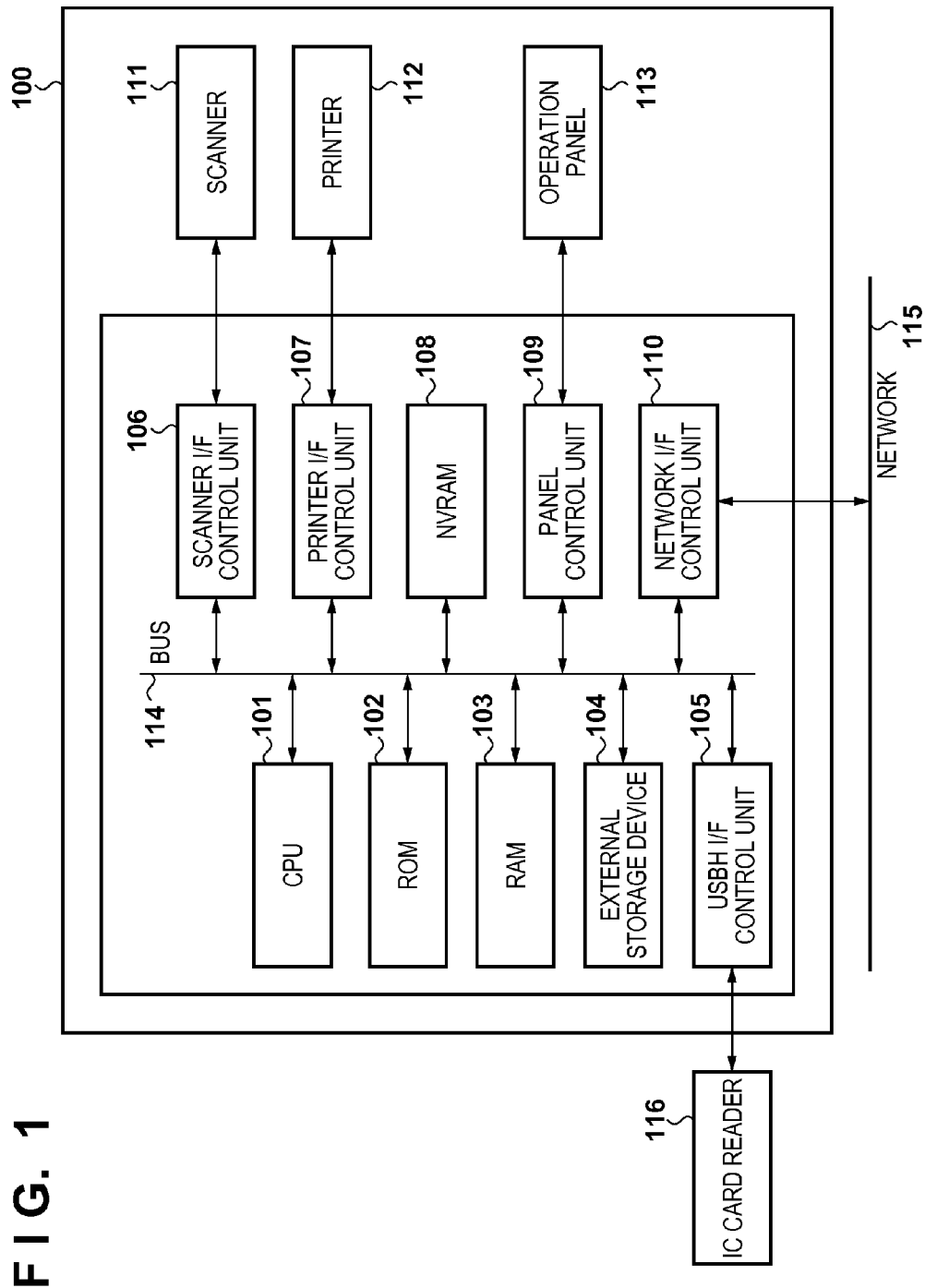
F I G. 1

F I G. 5A

| CLASS | WRAPPED Java STANDARD CLASS | METHOD | DESCRIPTION |
|---|---|---|---|
| ResourceService | | | CLASS FOR APPLICATION ISSUING RESOURCE ACQUISITION REQUEST |
| | | getFile | ACQUIRE FILE OBJECT MANAGED BY RESOURCE SERVICE. RETURN INSTANCE OF RSFile CLASS |
| | | getSocket | ACQUIRE SOCKET OBJECT MANAGED BY RESOURCE SERVICE. RETURN INSTANCE OF RSSocket CLASS |
| | | getThread | MANAGE THREAD OBJECT MANAGED BY RESOURCE SERVICE. RETURN INSTANCE OF RSThread CLASS |
| RSFile | Java.io.File | | WRAPPER CLASS OF FILE MANAGED BY RESOURCE SERVICE. HAS FUNCTION INHERITED FROM STANDARD File CLASS. WHEN ONE FSFile IS GENERATED, ONE IS ADDED TO USE FILE DESCRIPTOR COUNT. |
| | | delete | DELETE FILE MANAGED BY RESOURCE SERVICE. SUBTRACT FILE SIZE FROM USE AMOUNT OF STORAGE. |
| | | InputStream | CLASS OF FILE MANAGED BY RESOURCE SERVICE |
| RSFileInputStream | Java.io.FileInputStream | | |
| | | close | CLOSE FILE READ BY RSFileInputStream AND SUBTRACT ONE FROM USE FILE DESCRIPTOR COUNT |

F I G. 5B

| RSFileOutputStream | Java.io.FileOutputStream | OutputStream CLASS OF FILE MANAGED BY RESOURCE SERVICE | | |
|---|---|---|---|---|
| | | close | CLOSE FILE WRITTEN BY RSFileOutputStream AND SUBTRACT ONE FROM USE FILE DESCRIPTOR COUNT | |
| | | write | ADD SIZE OF WRITTEN DATA TO USE STORAGE SIZE MANAGED BY RESOURCE SERVICE | |
| RSSocket | Java.net.Socket | HAS FUNCTION INHERITED FROM Socket CLASS OF WRAPPER CLASS STANDARD OF SOCKET MANAGED BY RESOURCE SERVICE. WHEN ONE FSSocket IS GENERATED, ONE IS ADDED TO USE SOCKET COUNT | | |
| | | close | CLOSE SOCKET AND SUBTRACT ONE FROM USE SOCKET COUNT | |
| RSThread | Java.lang.Thread | HAS FUNCTION INHERITED FROM Thread CLASS OF WRAPPER CLASS STANDARD OF THREAD MANAGED BY RESOURCE SERVICE. WHEN ONE FSThread IS GENERATED, ONE IS ADDED TO USE THREAD COUNT | | |
| | | start | START EXECUTION OF THREAD. WHEN start METHOD ENDS, SUBTRACT ONE FROM USE THREAD COUNT | |

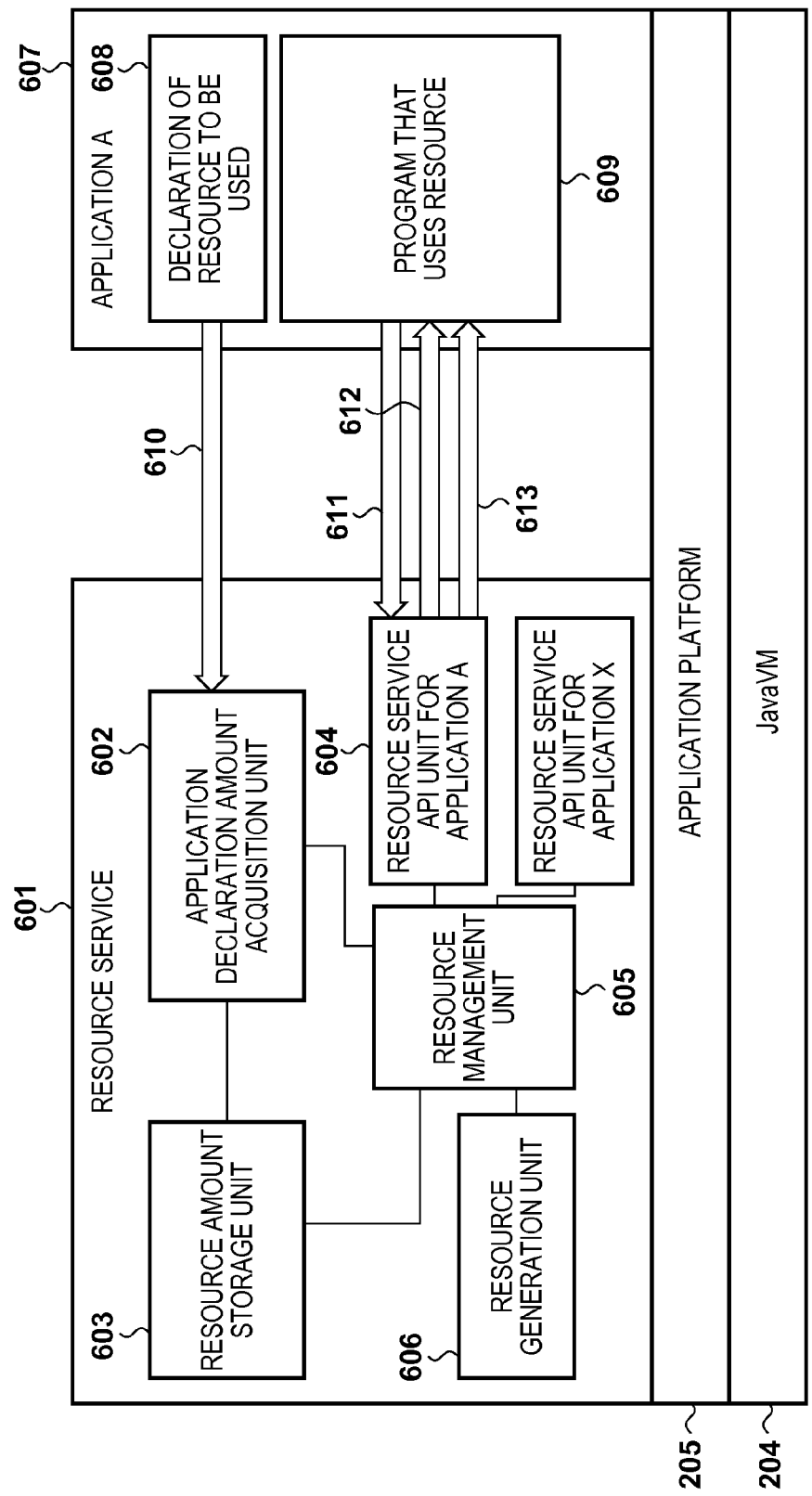

F I G. 8

| APPLICATION NAME | DECLARED RESOURCE AMOUNT | | USED RESOURCE AMOUNT | |
|---|---|---|---|---|
| APPLICATION A | FILE | 20MB | FILE | 1MB |
| | FILE DESCRIPTOR | 20 | FILE DESCRIPTOR | 1 |
| | SOCKET | 10 | SOCKET | 1 |
| | THREAD | 10 | THREAD | 1 |
| 801 ⋯ | 802 ⋯ | | 803 ⋯ | |
| APPLICATION D | FILE | 200MB | FILE | 10MB |
| | FILE DESCRIPTOR | 5 | FILE DESCRIPTOR | 1 |
| | SOCKET | 5 | SOCKET | 0 |
| | THREAD | 5 | THREAD | 0 |

F I G. 14

| FUNCTION | RESOURCE SERVICE | RSI SERVICE |
|---|---|---|
| RESOURCE SERVICE API | ○ | ○ |
| RESOURCE MANAGEMENT FUNCTION | ○ | × |
| RESOURCE GENERATION FUNCTION | ○ | ○ |
| RESOURCE SERVICE REGISTRATION INTERFACE | × | ○ |
| PROGRAM SIZE | LARGE | SMALL |
| USE RESOURCE SIZE | LARGE | SMALL |
| MODULE TO BE INSTALLED OR ACTIVATED | APPLICATION PLATFORM | RESOURCE SERVICE |
| MODULE TO BE STOPPED OR UNINSTALLED | APPLICATION PLATFORM | NA |

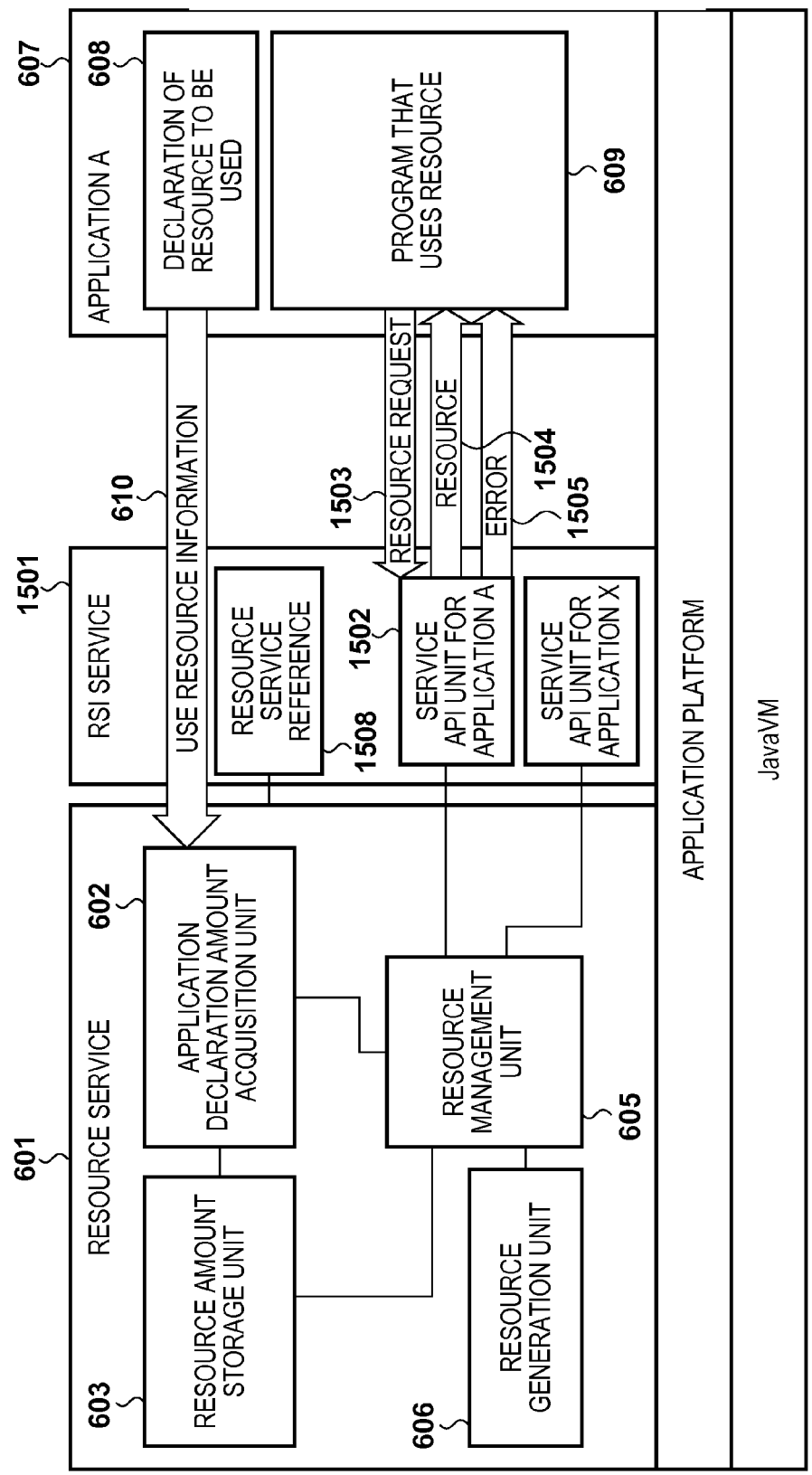

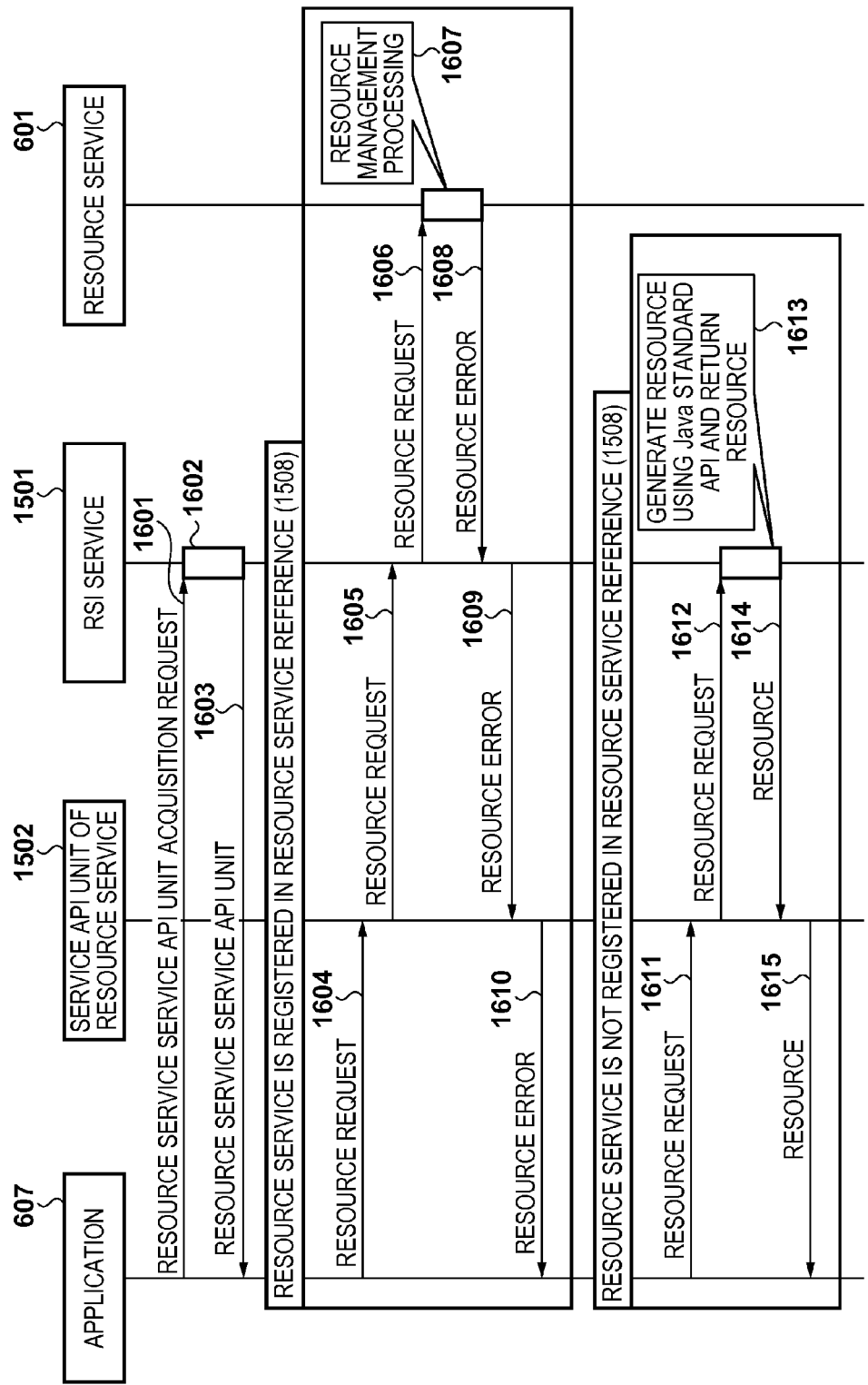

FIG. 17

| APPLICATION NAME | USED RESOURCE AMOUNT | | |
|---|---|---|---|
| APPLICATION A | FILE | 1MB | |
| | FILE DESCRIPTOR | 1 | |
| | SOCKET | 1 | |
| | THREAD | 1 | |
| 1702 ⋮ | 1703 ⋮ | | |
| APPLICATION D | FILE | 10MB | |
| | FILE DESCRIPTOR | 1 | |
| | SOCKET | 0 | |
| | THREAD | 0 | |

1701

F I G. 19A
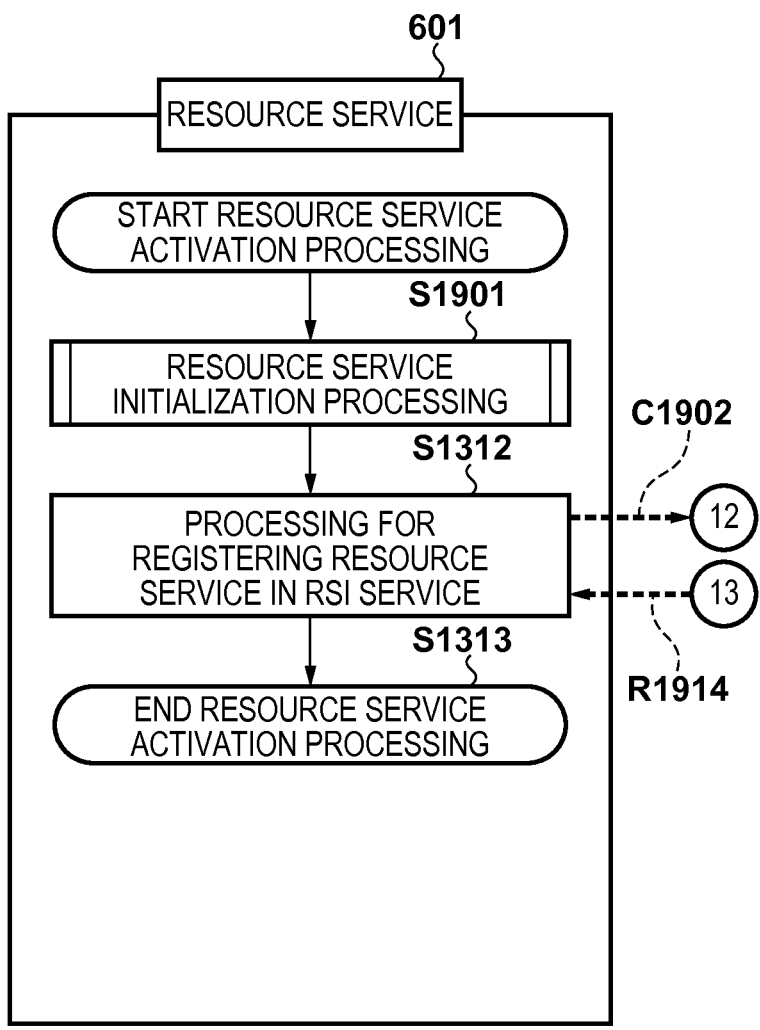

IMAGE FORMING APPARATUS AND RESOURCE MANAGEMENT METHOD

BACKGROUND OF THE INVENTION

Field of the Invention

The present invention relates to an image forming apparatus and a resource management method.

Description of the Related Art

In order realize solutions, an increasing number of current multifunction peripherals (MFPs) have functions for executing applications apart from the functions incorporated in the MFPs, such as copying, scanning, and printing of documents. Many MFPs have an execution environment for Java (registered trademark) as an application execution environment, and can execute applications written in Java. Examples of an application execution environment include Canon's MEAP. In the case of a Java application on a PC, one Java process executes one application. On the other hand, there are many MFPs that use an OSGi framework or the like and execute a plurality of applications using one Java process due to limitations on the CPU or memory. The OSGi framework is an application platform for executing a plurality of applications on one Java VM. In the case where one of applications that are being executed on an MFP has a bug and a resource leak such as a memory leak, for example, occurs, there is a possibility that an error resulting from a resource shortage such as OutOfMemoryError will occur and all applications will stop. Also, since an error resulting from a resource shortage, such as OutOfMemoryError, for example, occurs when an application requests a resource and the resource to be allocated is not available, there are cases where such an error occurs while an application that is running normally is being executed.

Therefore, it is difficult to specify the application where the resource leak has occurred.

Incidentally, there are techniques for measuring resources for each thread, as described in Japanese Patent Laid-Open No. 2005-269439. However, it is not possible to measure use resources for each application in the case where one thread executes the codes of a plurality of applications, as shown in FIG. 13 in Japanese Patent Laid-Open No. 2005-269439.

Moreover, there are techniques for managing resources by modifying the application execution environment itself, as shown in Japanese Patent Laid-Open No. 2013-145503. However, there are difficulties in performing modification that adds resource management to the application execution environment in an MFP that has limited resources such as memory and CPU.

SUMMARY OF THE INVENTION

The present invention provides a resource management apparatus and method that manage resources for each application. Furthermore, the present invention provides an image forming apparatus that can additionally carry out resource management in an application execution environment in which resources are limited and a method for resource management by the image forming apparatus.

In order to achieve the above-described object, the present invention has the following configuration. Specifically, according to one aspect of the present invention, there is provided an image forming apparatus comprising: a holding unit that receives a declared resource amount to be used from each of applications installed on an application platform, and holds the declared resource amount for each application; and a resource management unit that, in response to a resource acquisition API being called from an application, determines whether or not a resource amount used by the application exceeds the declared resource amount, issues a notification that the resource amount exceeds the declared resource amount to the application, in a case where it is determined that the resource amount exceeds the declared resource amount, and issues a request to the application platform to generate a resource and delivers a resource object generated in response to the request, in a case where it is determined that the resource amount does not exceed the declared resource amount.

According to the present invention, it is possible to manage resources for each application in an application execution environment in which a plurality of applications are operated in parallel. Also, resource management can be additionally carried out with ease in an application execution environment in which resources are limited.

Further features of the present invention will become apparent from the following description of exemplary embodiments with reference to the attached drawings.

BRIEF DESCRIPTION OF THE DRAWINGS

FIG. 1 is a diagram of a system configuration.

FIGS. 5A and 5B are diagrams showing an API provided by a resource service.

FIG. 6 is a diagram of a software configuration of the resource service.

FIG. 8 is a diagram showing a resource amount storage unit of a resource service.

FIG. 14 is a diagram showing a comparison table of functions of a resource service and an RSI service.

FIG. 15A is a diagram of a software configuration of the resource service of Embodiment 2.

FIG. 16 is a diagram showing a resource acquisition sequence of Embodiment 2.

FIG. 17 is a diagram showing a resource use amount storage table of the RSI service.

FIG. 19A is a flowchart of processing for updating the resource amount storage unit of the resource service of Embodiment 3.

DESCRIPTION OF THE EMBODIMENTS

Embodiment 1

Hardware of Image Forming Apparatus

Figure 2:
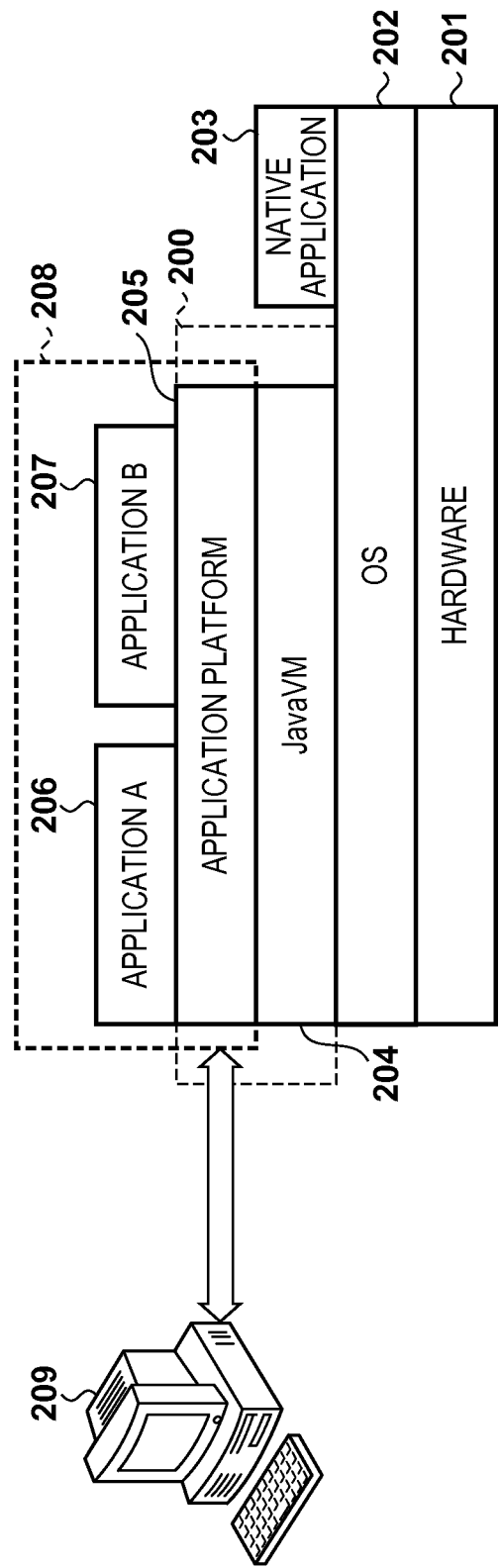
FIG. 2 is a diagram of a software configuration.

FIG. 1 is a block diagram showing the hardware configuration of an image forming apparatus 100 that is a multifunction peripheral, for example. A CPU 101 is a computer or a processor that executes software programs of the image forming apparatus 100 and performs overall control of the apparatus. A ROM 102 is a read only memory and stores a boot program, fixed parameters, and the like for the apparatus. A RAM 103 is a random access memory and is used for temporally storing data when the CPU 101 controls the apparatus. An external storage device 104 is used for storing various types of data such as installed applications, application data, and print data. A USBH I/F control unit 105 is for controlling a USB host interface and controls communication with various USB devices. A scanner I/F control unit 106 is an apparatus that controls a scanner 111. A printer I/F control unit 107 is an apparatus that controls a printer 112. A NVRAM 108 is a non-volatile memory and stores various types of setting values for an application management apparatus. A panel control unit 109 controls an operation panel 113 and is for displaying various types of information and receiving input of instructions from a user. A network I/F control unit 110 controls transmission and reception of data with a network 115. The CPU 101, ROM 102, RAM 103, external storage device 104, USBH I/F control unit 105, scanner I/F control unit 106, printer I/F control unit 107, NVRAM 108, panel control unit 109, network I/F control unit 110 are connected to a bus 114. Also, the bus 114 is a system bus where a control signal from the CPU 101 or a data signal between apparatuses is transmitted or received. An IC card reader 116 is a USB device for performing authentication.

Software of Image Forming Apparatus

The image forming apparatus 100 provides an application platform such as an OSGi platform, for example, installs a plurality of application programs written in JAVA (registered trademark) on the application platform, and can execute the programs in parallel. The image forming apparatus 100, in this specification, is also called an application management apparatus from the point of view of serving as an apparatus that manages applications, and is also called a resource management apparatus from the point of view of serving as an apparatus that manages resources for applications.

FIG. 2 is a diagram showing the configuration of software 200 of the image forming apparatus 100. Hardware 201 is the RAM 102, CPU 101, or the like, which are shown in FIG. 1, for example, that execute the software of the application management apparatus. An OS 202 executes process management, memory management, and input/output management. A native application 203 is a program that realizes basic functions of the device, such as copy. The software 200 is constituted by a Java VM (Java virtual machine) 204 and an application platform 205. The Java VM 204 is a virtual machine that executes Java programs. The application platform 205 is a program that manages a life cycle of applications on a single Java VM, such as the activation, stopping, installation, and uninstallation of at least one or more application programs, and is an OSGi platform, for example. Applications A206 and B207 are application programs that operate on the application platform 205. The Java VM 204 processes the application platform 205 and the applications A206 and B207 as one Java application 208. One example of applications that are executed on the application platform 205 is a resource service program, which will be described later. A PC 209 communicates with the application platform 205 via the network 115, and issues instructions for activating, stopping, installing, and uninstalling of an application program to the application platform 205.

Figure 3:
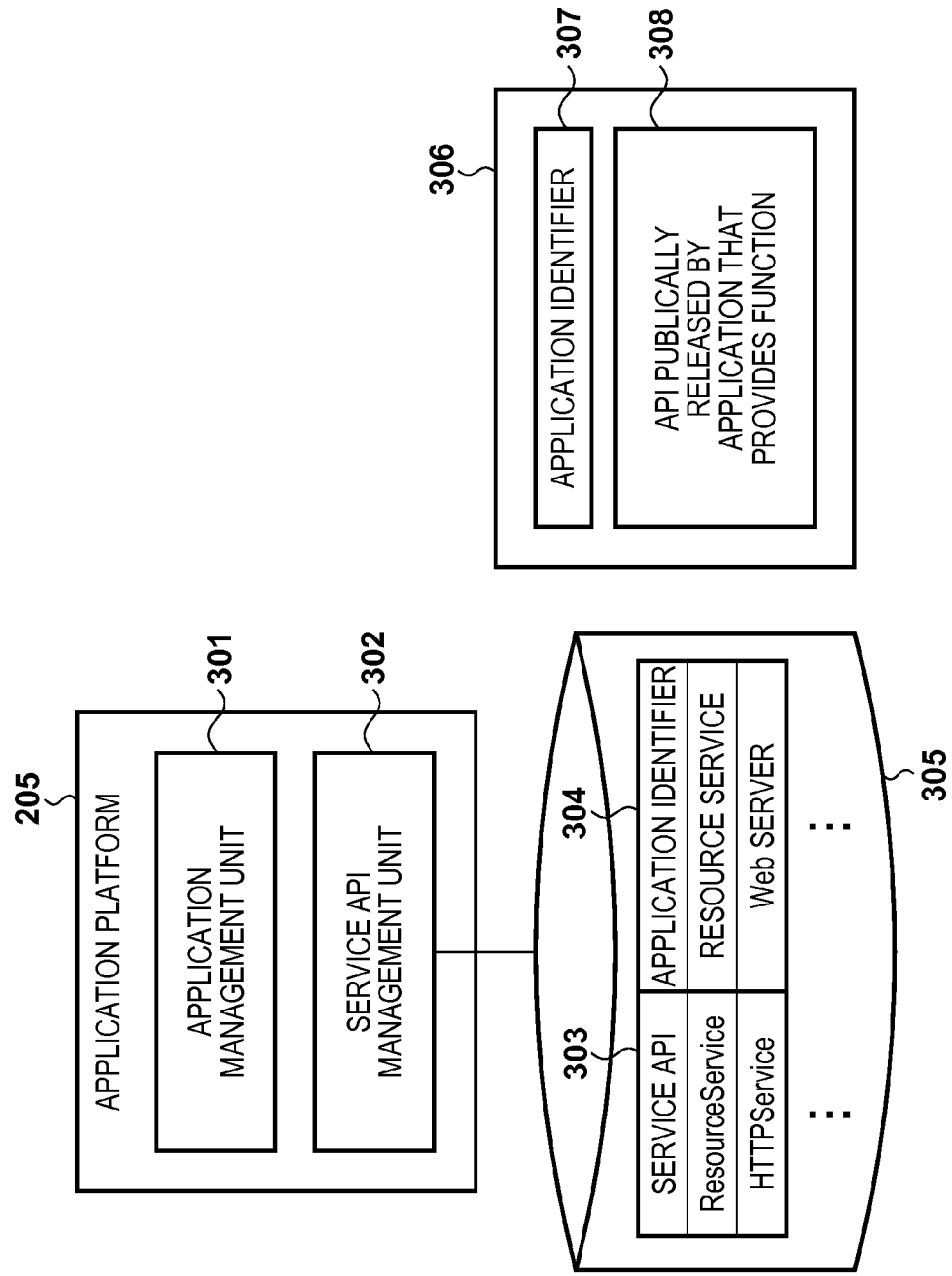
FIG. 3 is a diagram of an application platform configuration.

FIG. 3 is a diagram showing the configuration of the application platform 205. The application platform 205 includes an application management unit 301 that manages the life cycle of applications, such as the activation, stopping, installation, and uninstallation of application programs, and a service API management unit 302. The service API management unit 302 manages generation of a service API unit 306 for enabling a function (that is, a service) that is publically released by an application to be used by another application operating on the application platform. The service API management unit 302 has a table 305 constituted by the API 303 that is publically released by the application that provides the function and an identifier 304 of the application. When a new application is installed, for example, the application identifier of the application and an API for specifying the service are registered in the table 305.

The service API management unit 302 acquires the service API unit 306 corresponding to a request made by the application that uses the function from the application providing the function identified by the identifier 304 of the application, and sends the service API unit 306 to the application that uses the function. The service API unit 306 is configured by a field 307 storing the identifier of the application that uses the function and an API 308 that is publically released by the application that provides one or more functions. The application that uses the function acquires the service API unit 306 and uses the function of the application providing the function by calling the API 308 implemented in the service API unit 306. When the application that uses the function calls the service API unit 306, the service API unit 306 adds the application identifier 307 of the application that uses the function and calls an API that realizes the function of the actual application that provides the function. The procedure for requesting and providing a service via this service API will be described later with reference to FIGS. 4A and 4B.

FIGS. 5A and 5B shows a table of APIs provided to another application by a resource service according to this embodiment. The service API of the resource service implements the called API, and the application that uses the resource service calls these APIs to acquire and use resources. Specifically, the application calls a method corresponding to the requested service for an object of each class that is released as an API. A class field shown in FIGS. 5A and 5B is a class provided by the resource service to the application. A "wrapped Java standard class" field is a Java standard class name respectively wrapped by RSFile class, RSFileInputStream class, RSFileOutpuStream class, RSSocket class, and RSThread class. A method field indicates methods, among the methods of the respective classes, in which functions specific to the resource service are implemented. Note that the classes defined by wrapping the Java standard class is a resource object provided by the resource service, and the methods shown in FIGS. 5A and 5B are methods, among the methods of the wrapped Java standard class, in which the functions specific to the resource service are implemented. A description field describes functions specific to the resource service that are provided by the classes or methods.

The API that is publically released by a function providing application is specified by combination of a class and a method, for example. For example, a getFile method of a ResourceService class is specified as "ResourceService.getFile" or the like, and the API is specified and called. Therefore, a combination of a class name and a method name belonging to the class that are shown in FIGS. 5A and 5B is registered in the service API 305.

The API shown in FIGS. 5A and 5B provides the service described in the description field. For example, the ResourceService class is a class for the application requesting the resource service 601 to acquire or release a resource, and does not wrap the Java standard class. The getFile method of the ResourceService class is a method for acquiring a resource object of a file resource, and returns an instance of an RSfile class, that is, a resource object of the secured resource. The file object corresponds to the file resource. getSocket and getThread methods are methods for respectively acquiring a socket object and a thread object, and respectively correspond to a communication resource and a computing resource, for example.

Other classes are classes for resource objects, and are defined by wrapping the Java standard class. Description of each class indicates a method in which a function specific to the resource service is implemented among methods for the Java standard class wrapped by the class. Description of a method performing the same processing as that performed by the method for the wrapped Java standard class is omitted. For example, the RSfile class wraps Java.io.file, that is, a file class, and a delete method executes processing for subtracting a storage use amount equal to the deleted file size from the current use amount, in addition to deletion of the file class. Similar processing to that of the file class is performed on the methods of other file classes. Although description of the other classes and methods is omitted, FIGS. 5A and 5B can be read similarly to the above-described example. Thus, the resource object generated by using the resource service can be handled similarly to the resource (Java standard resource object) generated without using the resource service.

Service API Registration Processing

Figure 4A:
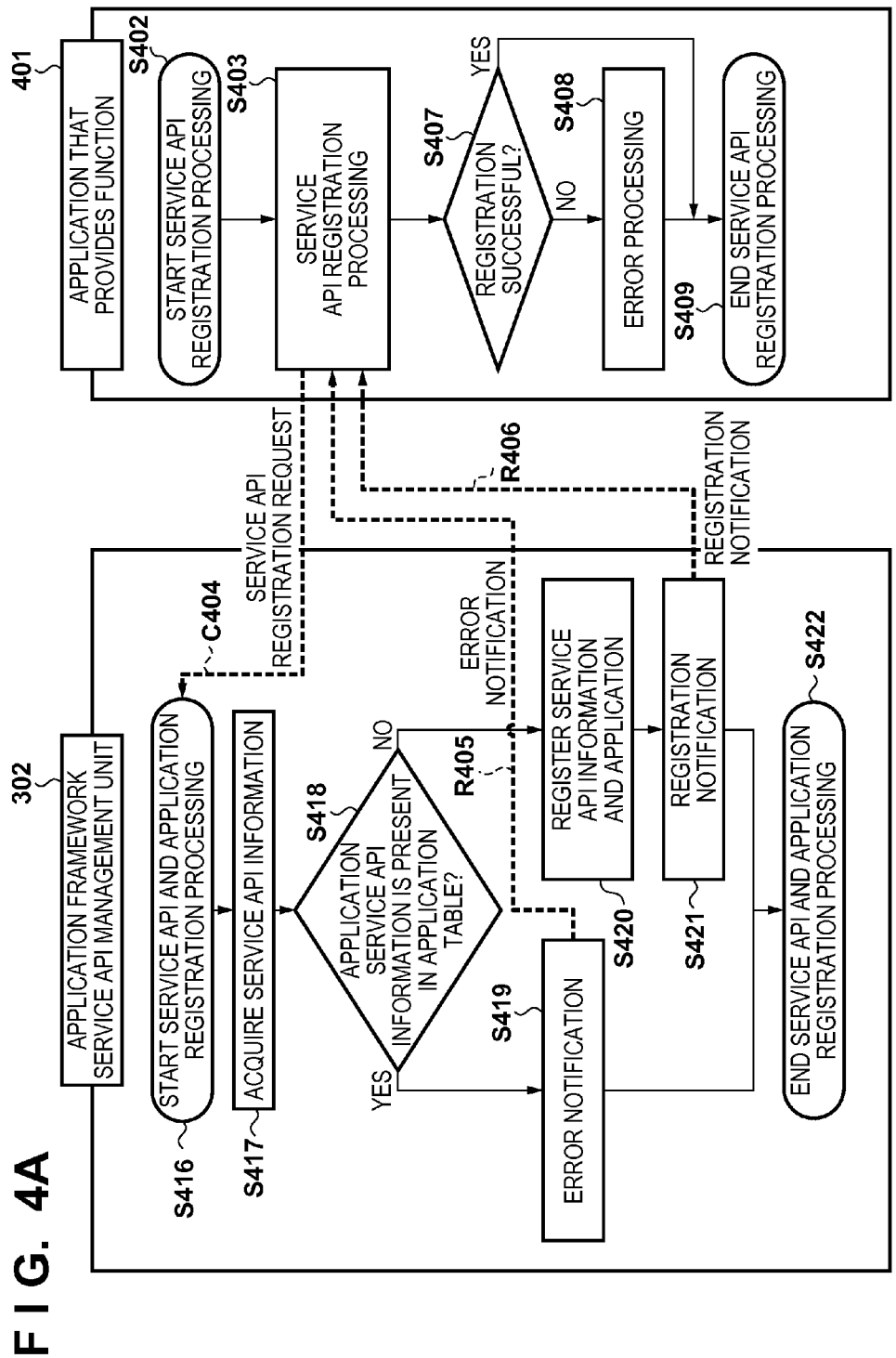
FIG. 4A is a flowchart of a procedure for an application to register an API.
Figure 4B:
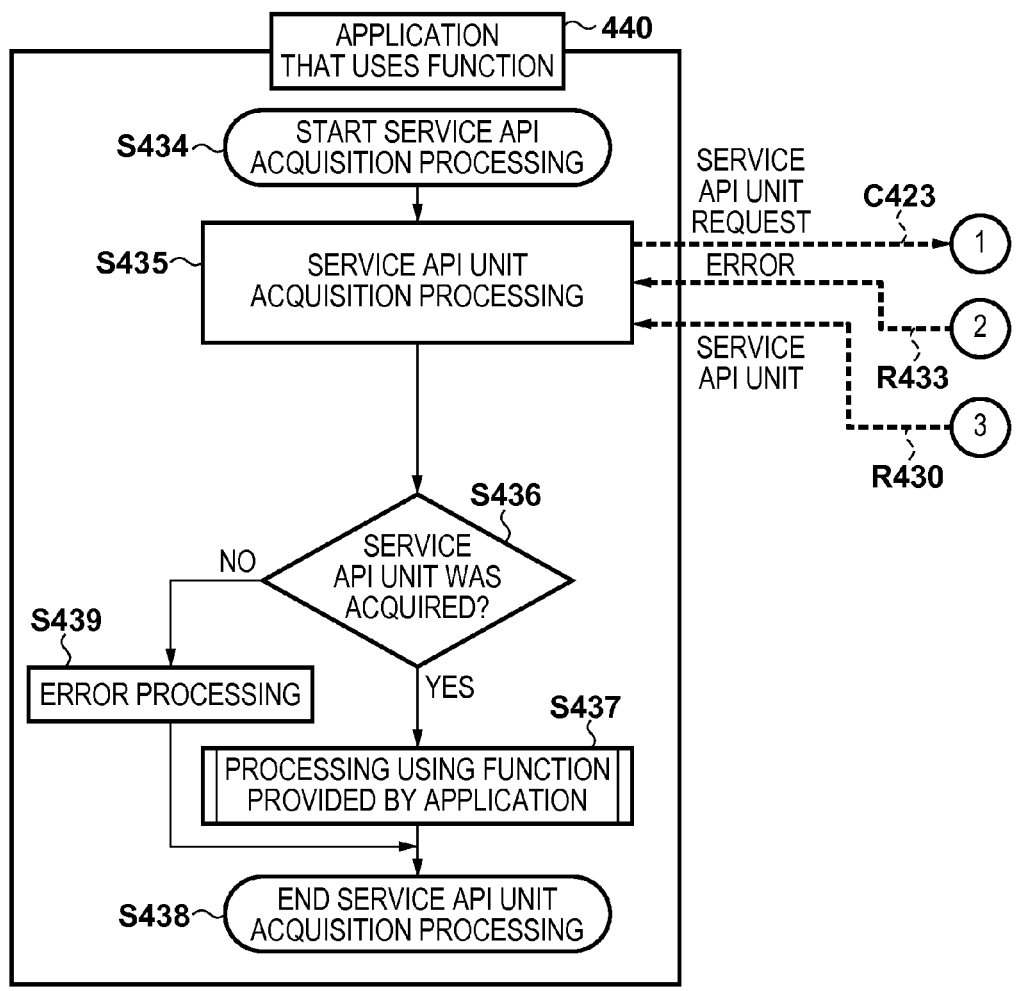
FIG. 4B is a flowchart of a procedure performed by an application to use a function via an API.
Figure 4C:
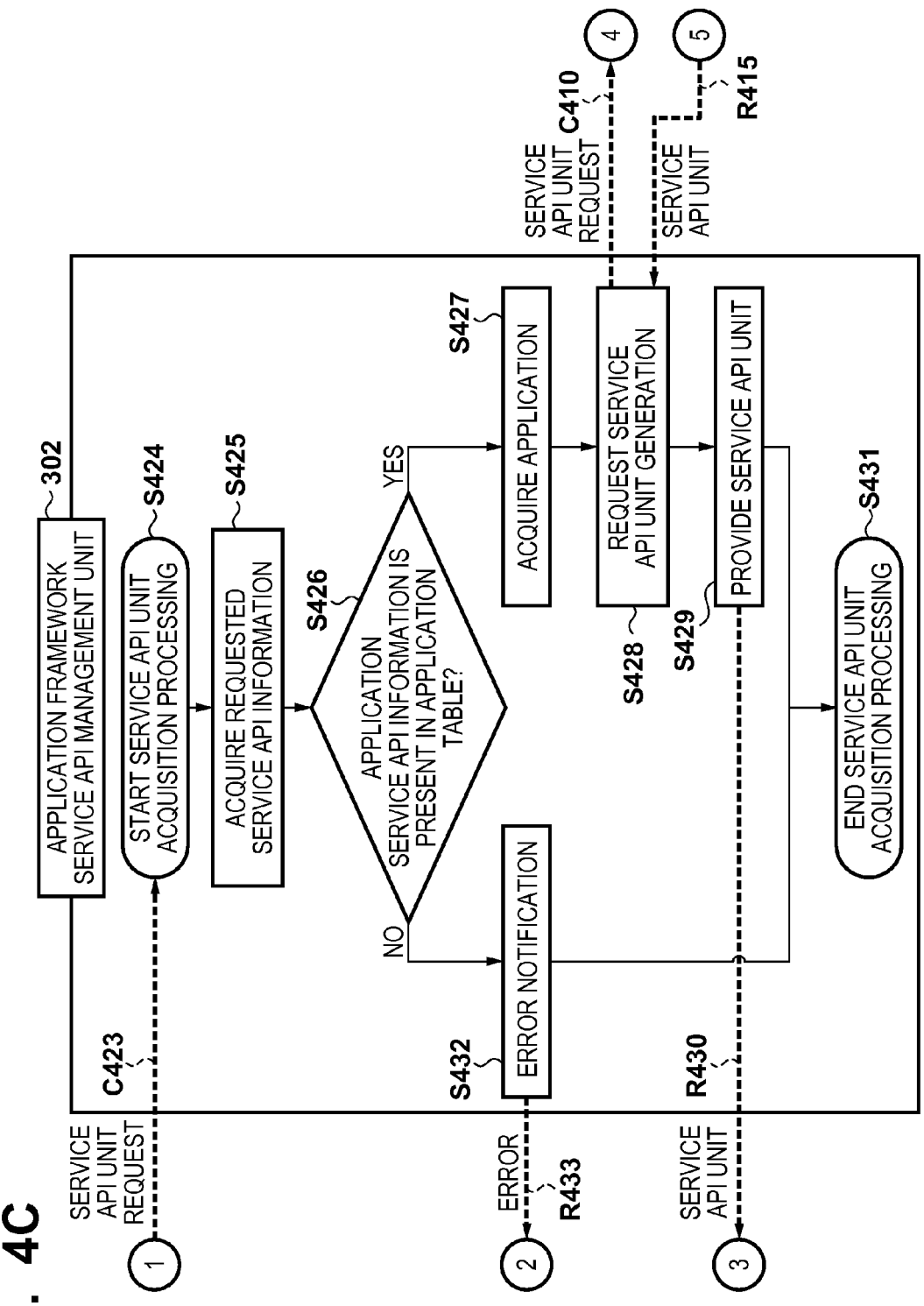
FIG. 4C is a flowchart of a procedure performed by a service API management unit to provide a service API.
Figure 4D:
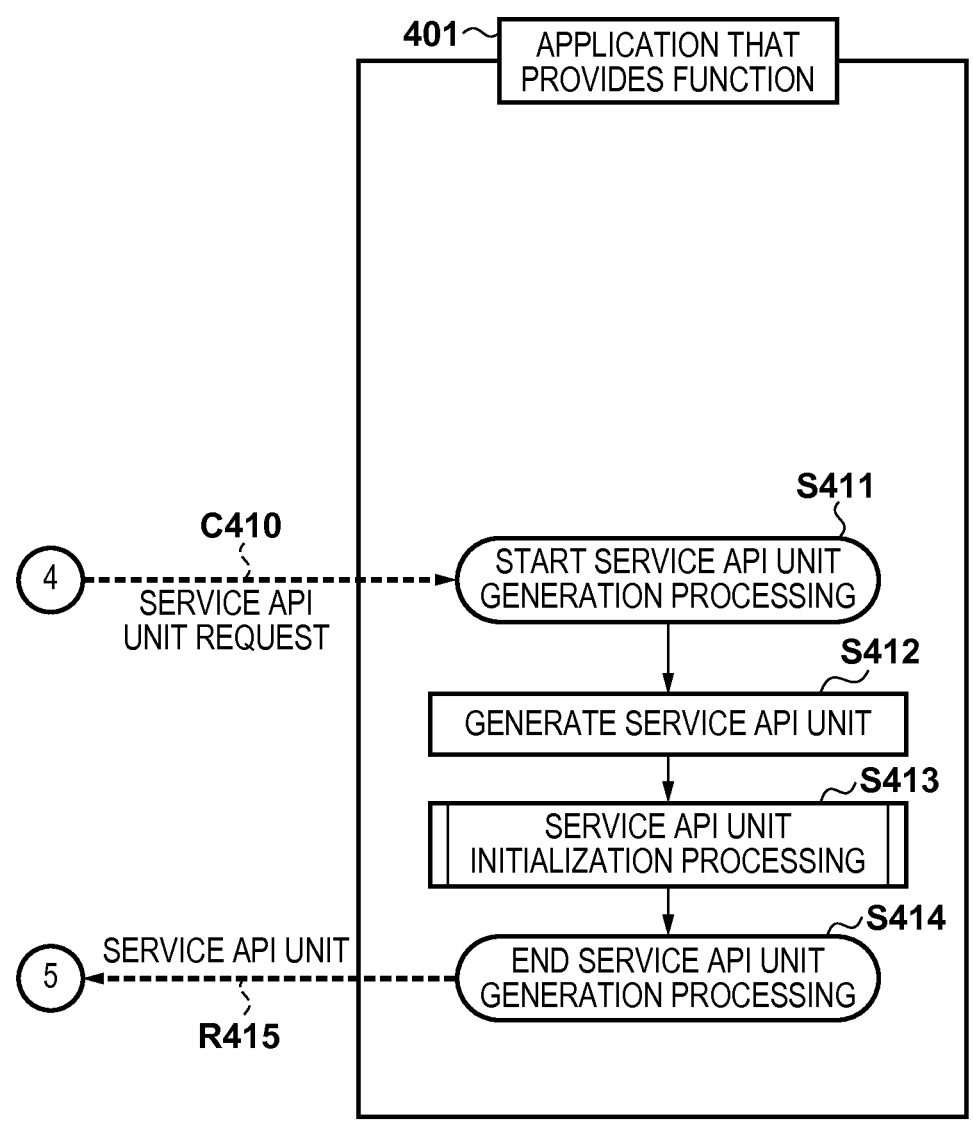
FIG. 4D is a flowchart of a procedure performed by an application to provide a function via an API.

FIG. 4A is a diagram showing processing for an application 401 that publically releases a function to register an API in the service API management unit 302, and FIGS. 4B to 4D are diagrams showing processing for an application that uses the function to acquire the service API unit. First, the API registration processing will be described with reference to FIG. 4A.

The application 401 that publically releases the function, or in other words, that provides a service starts the service API registration processing (S402). The application 401 that publically releases the function issues a service API registration request C404 to the service API management unit 302 using service API information and an application identifier as arguments (S403). The service API information includes information for specifying a service, such as an identification name. When a registration notification R406 is returned from the service API management unit 302, the processing transitions to S409, and the service API registration processing ends (S409). When an error (R405) is returned, error processing is performed (S408), and the service API registration processing ends (S409).

Upon receiving the service API registration request C404, the service API management unit 302 starts the processing for registering the service API and the application (S416). First, the service API management unit 302 acquires the service API information and the application identifier from the API registration request C404 received in S416 (S417). Next, the service API management unit 302 searches the table 305, and checks whether the service API information acquired in S417 is already registered in the table 305 (S418). If the service API information is already registered in the table 305, the service API management unit 302 returns an error R405 to the application 401 publically releasing the function (S419), and ends the service API registration processing (S422). If the service API information is not registered, the service API management unit 302 registers the service API information and the application identifier acquired in S417 in the table 305 (S420). Moreover, the service API management unit 302 returns a registration notification R406 to the application 401 publically releasing the function (S421), and ends the service API registration processing (S422). In this example, the resource service executes the processing for registering the service API shown in FIG. 4A as the application providing the service, and registers the service API of the resource service and the application identifier of the resource service.

Service API Acquisition Processing

Next, service API unit acquisition processing will be described with reference to FIG. 4B to FIG. 4D. An application 440 that uses a function starts the service API unit acquisition processing (S434 in FIG. 4B). Next, the application 440 issues a service API unit request C423 to the service API management unit 302 using the service API information indicating a function that the application 440 desires to use and the application identifier of the application 440 itself as arguments (S435). The application 440 checks whether the service API unit was acquired from the service API management unit 302 (S436). In the case where an error is returned and the service API unit was not acquired, the application 440 performs error processing (S439) and ends the service API unit acquisition processing (S438). In the case where the service API unit was acquired, the application 440 performs processing in which an application providing the function, that is, a service to be provided by another application is used via the service API unit (Step S437), and ends the service API unit acquisition processing (S438). In the application 440 that uses the resource service, S437 is processing for acquiring and using the resource.

Upon receiving a service API unit request C423 from the application 440 that uses the function, the service API management unit 302 starts service API unit generation processing (S424 in FIG. 4C). The service API management unit 302 acquires the requested application API information from the service API unit request C423 (S425). Next, the service API management unit 302 searches the table 305 using the application API information acquired in S425 as a key, and if the service API information is not present, the service API management unit 302 issues a notification of an error R433 to the application 440 that has issued the service API unit request C423 (S432), and ends the service API unit generation processing (S431). If the service API information is present, the service API management unit 302 acquires an application identifier corresponding to the application API information (S427). Next, the service API management unit 302 issues a service API unit generation request C410 to the application 401 that is identified by the application identifier acquired in S427 and publically releases the function using the application identifier of the application 440 that uses the function as an argument (S428). Upon receiving a service API unit response R415 including the service API unit, the service API management unit 302 provides the service API unit R430 to the application 440 that uses the function (S429), and ends the service API unit acquisition processing (S431).

Upon receiving the service API unit generation request C410 from the service API management unit 302, the application 401 publically releasing the function starts processing for generating the service API unit (S411 in FIG. 4D). Next, the application 401 acquires the application identifier of the application 440 that uses the function from the service API unit generation request C410 (S412). Furthermore, the application 401 generates the service API unit, stores the application identifier, acquired in S412, of an application 440 that uses the function in the application identifier storage field 307, and performs processing for initializing the service API unit (S413). The application 401 returns the service API unit to the service API management unit 302 (R414), and ends the service API unit generation processing (S415). Note that the service API unit is an object, and generation and initialization of the service API unit in S413 are realized by generation and initialization of an instance of the service API in the present example. Therefore, in S437, the application 440 that uses the function uses a service provided through the API by calling the method corresponding to the function used by the generated object. Also, details of S413 will be described later with reference to FIG. 9.

As described above, the mechanisms described in FIGS. 4A and 4B are provided on the OSGi platform, for example, and registration of function providing applications (service bundle) and acquisition of the service API unit through a function use application (service consumption bundle) can be realized by functions provided on the OSGi.

Example of Resource Acquisition

FIG. 6 is a diagram showing the configuration of a resource service 601, which is a program providing a service according to resource management, and the configuration of a resource service correspondence application 607 that acquires a resource from the resource service 601 using the service provided by the resource service 601. The application 607 that acquires the resource from the resource service 601 is configured by application information 608 whose resource amount to be used is declared and a program 609 that realizes the function of the application. The program executes processing in which the resource acquired from the resource service 601 is used.

The resource service 601 is an application operating on the application platform 205. The resource service 601 includes an application declaration amount acquisition unit 602 that acquires a declaration of a resource amount to be used from the application and a resource amount storage unit 603 that stores the declared resource amount acquired by the application declaration amount acquisition unit 602 and the resource amount used by the application for each application in association with the application identifier, for example. Furthermore, the resource service 601 includes, for each application, a service API unit 604 of the resource service, a resource management unit 605 that determines whether a resource is provided to an application and a resource generation unit 606 that generates a resource. The service API unit 604 corresponds to the service API unit 306 shown in FIG. 3, and association with the application is implemented by the application identifier 307.

The application declaration amount acquisition unit 602 acquires information on the resource amount that is declared for use by the application 607 from the resource service correspondence application 607 (610).

The resource service correspondence application 607 calls the resource service API unit for an application A and issues a resource acquisition request (611). In the case where there is a resource to be allocated to an application A607, the resource service 601 returns the resource to the application A607 (612). If there is no resource to be allocated, the resource service 601 returns an error (613).

Application Information

Figure 7:
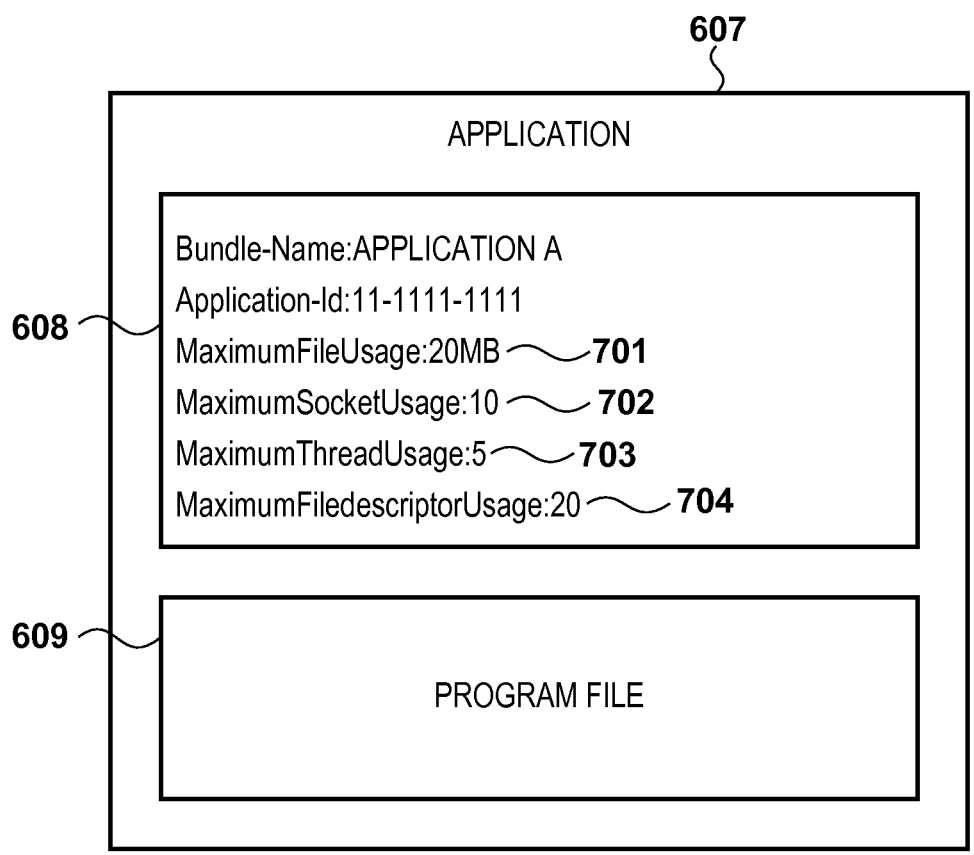
FIG. 7 is a diagram of a configuration of an application file.

FIG. 7 is a diagram showing details of the application information 608 configuring the application 607 that acquires a resource. Setting information for the application is stored in the application information 608 as a list of keys and values. As use resource information, a maximum disk size 701 indicating the maximum value of a disk size that is used, a maximum socket number 702 indicating the maximum number of sockets that are used, a maximum thread number 703 indicating the maximum number of threads that are used, and a maximum open file number 704 indicating the maximum number of files that are opened and used are written in the list of the values corresponding to the keys. Of course, these are merely examples of resources, and the list may include declaration of the maximum values of other resources. Also, information on the name and identification ID (identifier) of the application is also written. The application information 608 is included in a manifesto in Java (registered trademark), for example.

Resource Amount Storage Unit

FIG. 8 is a diagram showing details of the resource amount storage unit 603. The resource amount storage unit 603 stores, for each application (that is, for each application name 801), a declared resource amount 802 declared by the application and a used resource amount 803 used by the current application. The declared resource amount is the maximum value of each resource included in the resource information acquired from the application information 608 of the corresponding application. For example, with respect to the application A, the maximum values of the resources, namely, 20 MB as a file resource, 20 for a file descriptor (corresponding to the identifier of a file), 10 for a socket resource, 5 for a thread resource, are registered in the application A. Furthermore, the maximum values of the resources that can be provided by the resource service 601 may be registered in the resource management unit 603. Alternatively, the maximum values of the resources that can be provided by the resource service 601 may be registered in the resource management unit 605. The maximum values of the resource that can be provided by the resource service 601 is registered when the resource service 601 is installed, in correspondence with the limitation on resources that can be provided by the application platform 205, for example.

Service API Unit Initialization Processing

Figure 9:
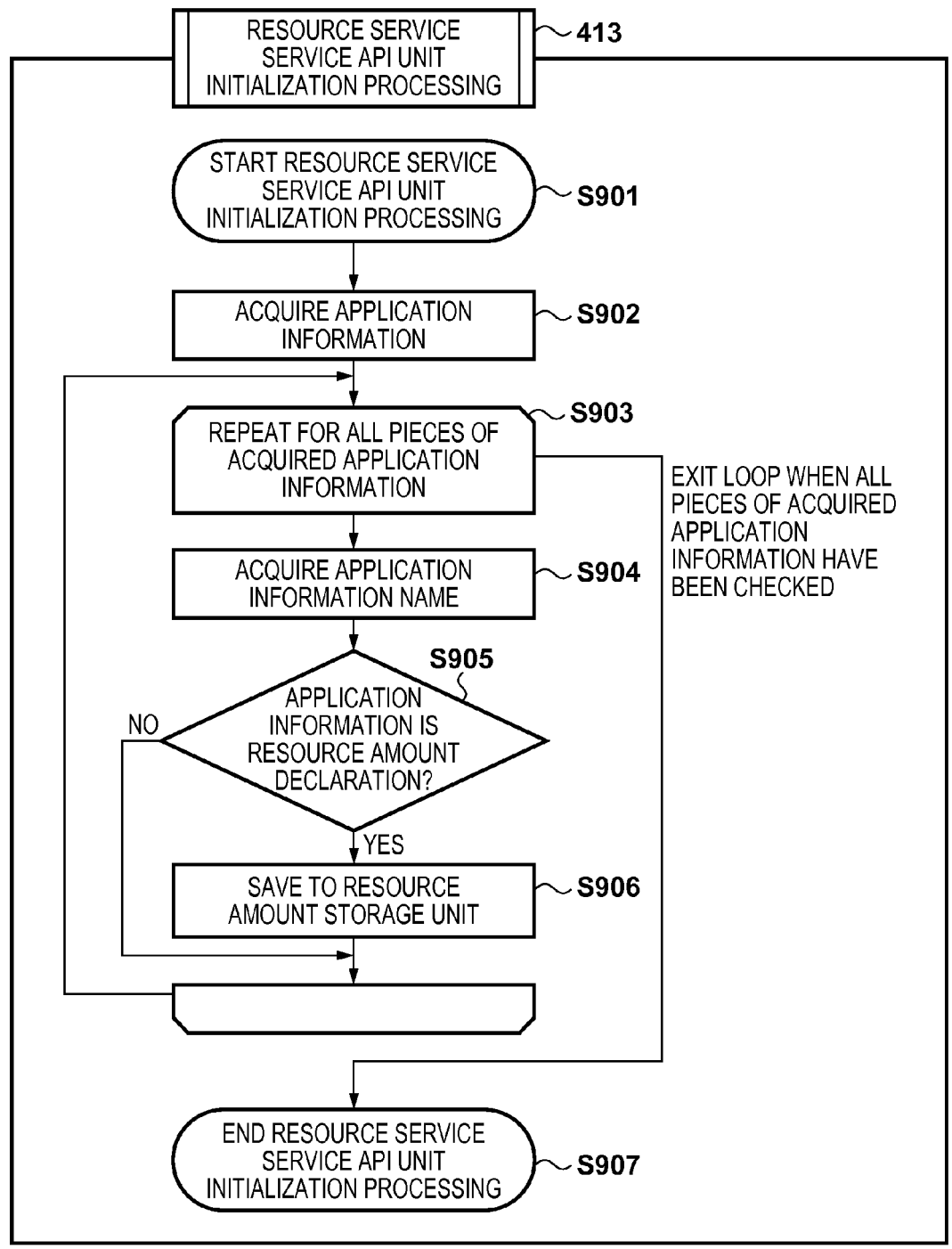
FIG. 9 is a flowchart of processing for initializing a service API unit.

FIG. 9 is a diagram showing details of service API unit initialization processing S413 executed when the service API unit of the resource service 601 is acquired, and shows details of step S413 shown in FIG. 4D. Note that among service APIs of the resource service, there are cases where an API that is called in order to issue a resource request is particularly called a resource acquisition API. When the service API unit initialization processing is started (S901), the application declaration amount acquisition unit 602 of the resource service 601 acquires application information of the application 440 that is attempting to acquire the service API unit (S902). The request of the service API unit received in S411 includes the application identifier of the application 440 that utilizes the resource service 601, and therefore the application 440 can be specified. The acquired application information is acquired as a list of keys and values as reference numerals 701 to 704 shown in FIG. 7.

In steps S903 to S906, processing of steps S904 to S906 is performed on all items in the list included in the application information acquired in S902, and when all of pieces of application information are checked, the processing exits the loop (S903), and the resource service 601 the service API unit initialization processing S413 ends. The name of the application information is acquired in the loop (S904). Next, it is determined whether a key included in the acquired application information is a predetermined key indicating a resource amount declaration (S905), and if the key indicates the resource amount declaration, the processing transitions to S906. If the key does not indicate the resource amount declaration in S905, the processing transitions to S903. In S906, the acquired resource amount is stored in the resource amount storage unit 603 for each application 801 and each resource 802 (S906), and the processing transitions to S903. An upper limit for each resource that is used can be stored and set for each application that uses the service through this procedure. The use resource amount 803 is initialized and set to 0.

Resource Acquisition Procedure

FIGS. 10A to 10D show processing in the application 607, the API unit 604 of the resource service, and the resource management unit 605 of the resource service when the application issues a resource acquisition request.

The application A607 starts processing for using a resource (S1001). The application A607 calls an API 308 that is provided by the API unit 604 of the resource service for the application A (C1038), and issues a resource request (S1002). At this time, information that is transmitted to the API unit 604 of the resource service includes the type of resource and the amount of a resource that the application A wants to acquire.

The application A607 determines whether the resource corresponding to the resource request was acquired (S1003), and if the requested resource was acquired, the processing transitions to S1004. If the requested resource was not acquired, the processing transitions to S1006. If the application A607 can acquire the requested resource, the application A607 performs processing in which the acquired resource is used (S1004). When S1004 is completed, the application A607 calls a resource release API of the API unit 604 of the resource service for the application A (C1041), issues a request to release an unnecessary resource (S1005), and ends the resource use processing (S1007).

Although the resource is released soon after use of the acquired resource ends in this flowchart, if the acquired resource is also used in other processing, release processing may be performed in the other processing. Information transmitted to the API unit 604 of the resource service when the resource release request is made is the type and amount of resource to be released. On the other hand, if the requested resource was not acquired, the application A607 performs error processing (S1006), and ends the resource use processing (S1007).

Upon receiving the resource acquisition request from the application A607 (C1038), the API unit 604 of the resource service for the application A starts resource acquisition processing (S1008). The API unit 604 of the resource service calls the resource management unit 605 (C1042), and issues the resource request (S1009). The information transmitted to the resource management unit 605 at this time is the identifier 307 of the application held by the API and the type and amount, delivered from the application, of resource that the application A wants to acquire.

If there is a response to the request, the API unit 604 of the resource service determines whether the resource was acquired (S1010), and if the resource was acquired, the processing transitions to S1011. If the resource was not acquired, the processing transitions to S1012. If the requested resource was acquired, the API unit 604 of the resource service returns the resource acquired in S1010 to the application A (R1039) and ends the resource acquisition processing (S1013). If the resource was not acquired, the API unit 604 returns an error to the application A in S1012 (R1040), and ends the resource acquisition processing (S1013).

Upon receiving the resource release request from the application A (C1041), the API unit 604 of the resource service starts the resource release processing (S1014). The API unit 604 of the resource service issues the resource release request (C1045) to the resource management unit 605 (S1015). Information transmitted to the resource management unit 605 at this time includes the identifier 526 of the application held by the API and the type and amount, delivered from the application, of the resource that is to be released. Next, the API unit 604 of the resource service ends the resource release processing (S1016).

Upon receiving the resource request from the API unit 604 of the resource service (C1042), the resource management unit 605 starts the resource acquisition processing (S1017). First, the resource management unit 605 acquires the application identifier that uses the resource from the resource request made by the API unit 604 of the resource service (S1018). Next, the type of requested resource is acquired (S1019). Furthermore, the amount of the requested resource is acquired (S1020). Next, the resource management unit 605 acquires the current resource use amount 803 of the resource type acquired in S1019 used by the application identified by the application identifier acquired in S1018 from the resource amount storage unit 603 (S1021). Furthermore, the resource management unit 605 acquires the declared resource amount 802 of the resource type acquired in S1019 declared by the application identified by the application identifier acquired in S1018 from the resource amount storage unit 603 (S1022).

Next, the resource management unit 605 determines whether the sum of the resource use amount acquired in S1021 and the requested resource amount acquired in S1020 exceeds the declared resource amount acquired in S1022 (S1023). If the sum does not exceed the declared resource amount, the processing transitions to S1024. If the sum exceeds the declared resource amount, the processing transitions to error processing (S1030), the resource management unit 605 issues a notification of an error to the API unit of the resource service (R1044), and the resource acquisition processing ends (S1029). The error means that the requested resource cannot be secured.

The resource management unit 605 acquires the total resource use amount of the resource type acquired in step S1019 by all applications (S1024). Next, the resource management unit 605 determines whether the sum of the total amount of use resource acquired in S1024 and the requested resource amount acquired in S1020 exceeds the resource amount provided by the application platform 205 (S1025). The resource amount provided by the application platform 205 is given in advance and the resource management unit 605 holds this resource amount, for example. If the sum exceeds the resource amount, the processing transitions to the error processing (S1030), the resource management unit 605 issues a notification of an error to the API unit of the resource service (R1044) and ends the resource acquisition processing (S1029). If the sum does not exceed the resource amount, the processing transitions to S1026.

In S1026, the resource management unit 605 adds the requested resource amount acquired in S1020 to the resource use amount 803 of the resource type acquired in S1019 used by the application identified by the application identifier stored in the resource amount storage unit 603 and acquired in S1018. Next, the resource management unit 605 issues a request to the application platform for the resource generation unit 606 to generate the requested resource (S1027). When the resource is generated, the resource management unit 605 returns the requested resource to the API unit 604 of the resource service in S1028 (R1043), and ends the resource acquisition processing (S1029). Returning of a resource involves information (path name or the like) for accessing the generated resource being returned, for example. Resources indicate elements of hardware or software that can be used for processing in the image forming apparatus, and the resource service manages resources such as those shown in FIGS. 5A and 5B. Specifically, resource service manages files as a storage resource, sockets as a communication resource, and threads as a computing resource. Also, a resource object can be an abstraction of a resource as seen from an application (including a resource server) that is executed on the application platform, and is formed by encapsulating information indicating a secured resource together with a method indicating processing to be performed on the resource or the like, for example. Alternatively, it is possible to view the resource as being expressed by the resource object.

Upon receiving a resource release request from the API unit 604 of the resource service (C1045), the resource management unit 605 starts the resource release processing (S1031). The resource management unit 605 acquires the identifier of the application that uses the resource from the resource release request made by the API unit 604 of the resource service (S1032). Next, the type of resource to be released is acquired (S1033). Furthermore, the resource management unit 605 acquires the amount of the resource to be released (S1034). Next, the resource management unit 605 releases the resource designated in S1033 (S1035). The resource management unit 605 issues a request to release the resource acquired for the application platform when the resource is released, using a procedure similar to making of a request for a resource. Accordingly, the designated resource is released. In S1036, the resource management unit 605 subtracts the requested resource amount acquired in S1035 from the resource use amount 803 of the resource type acquired in S1033 used by the application that is stored in the resource amount storage unit 603 and identified by the application identifier acquired in S1032. The resource management unit 605 ends the resource release processing in S1037.

Figure 10A:
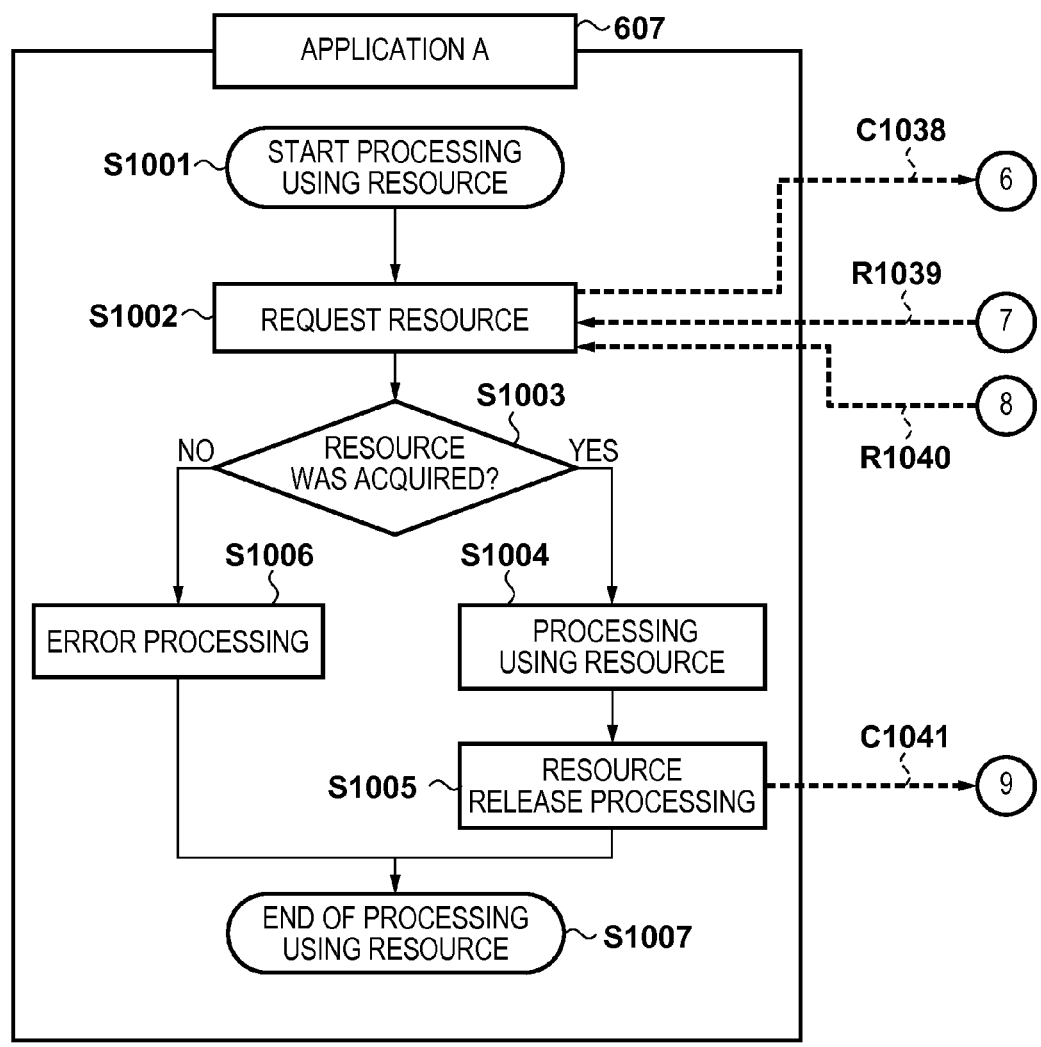
FIGS. 10A to 10D are flowcharts of resource acquisition.
Figure 10B:
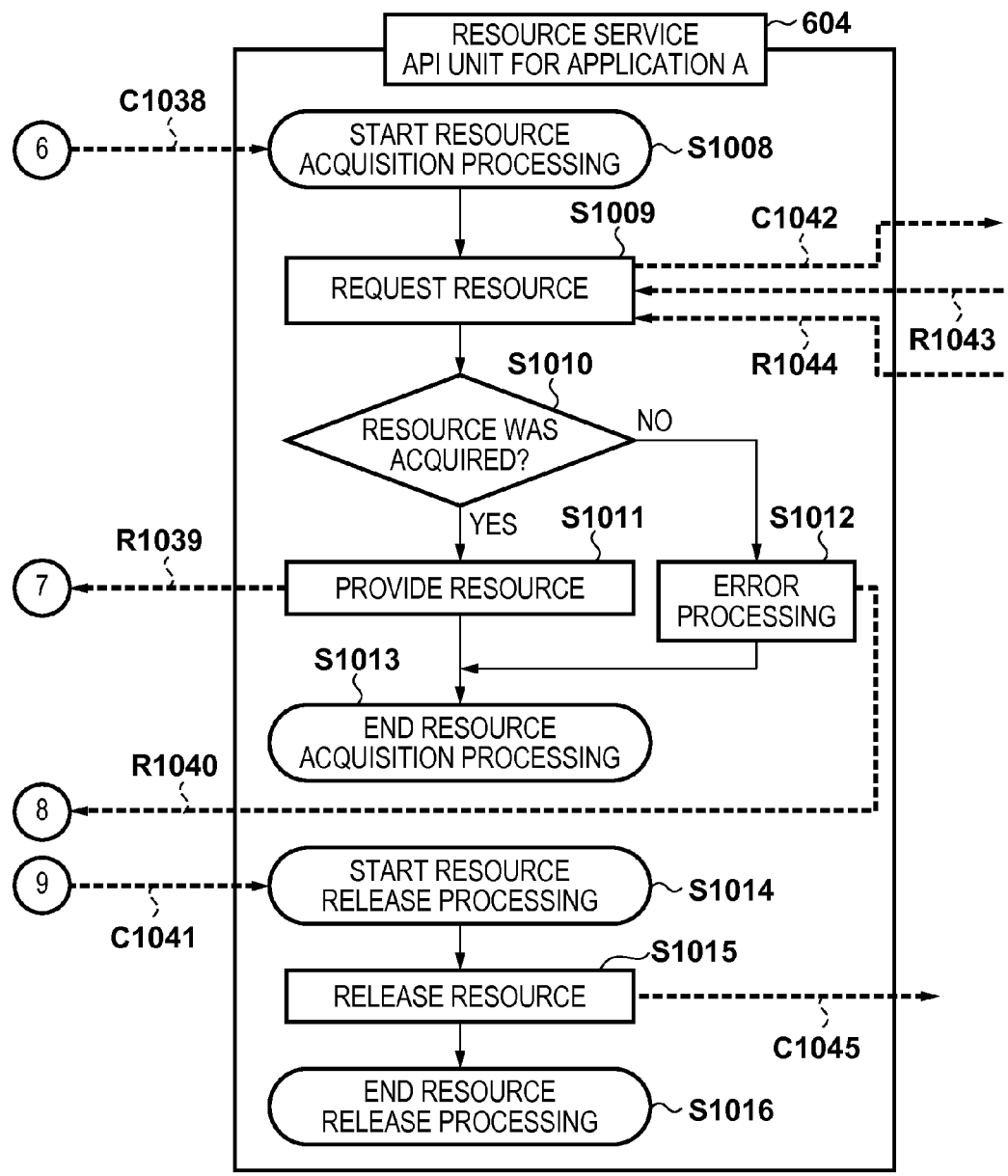
Figure 10C:
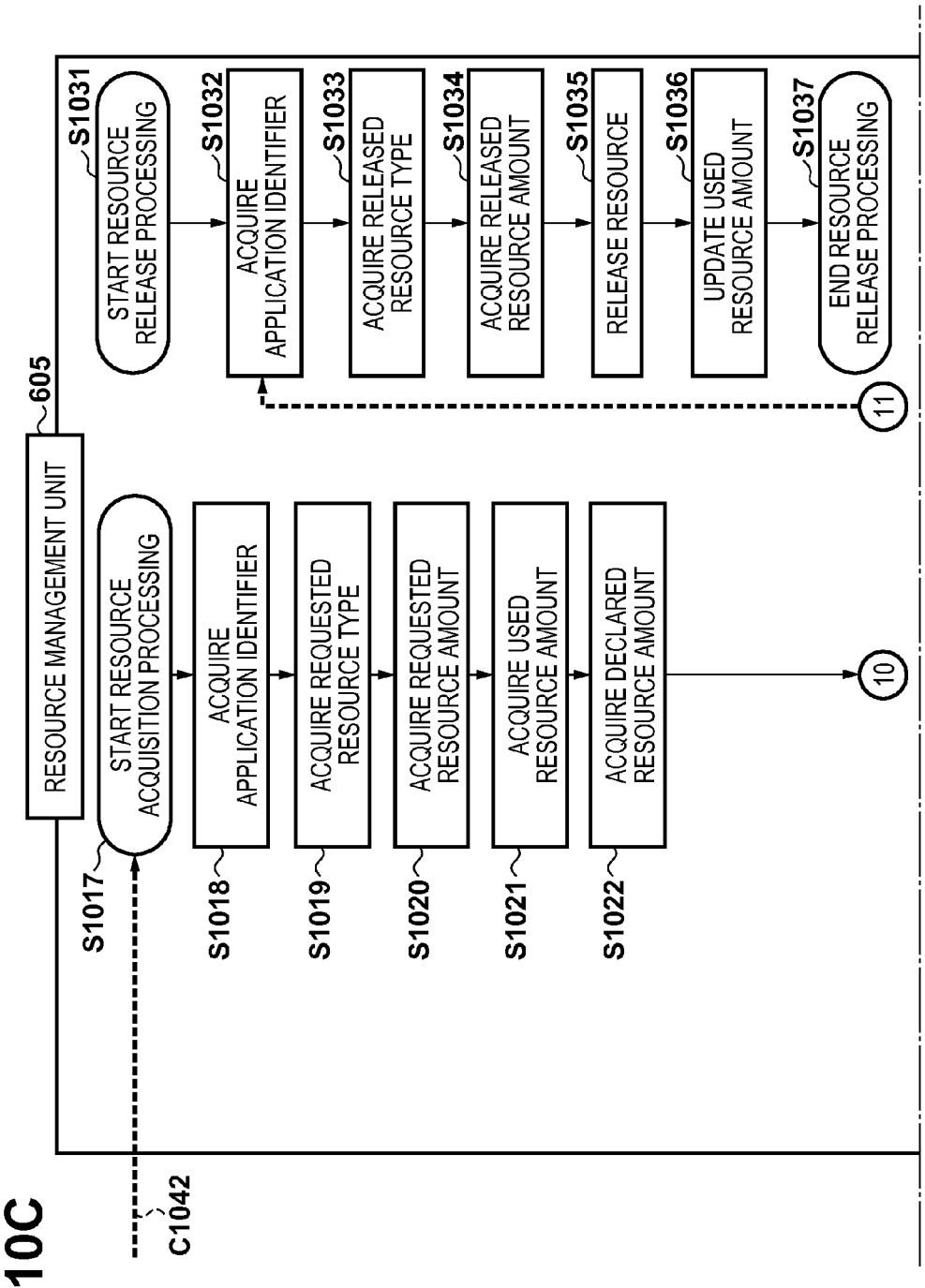
Figure 10D:
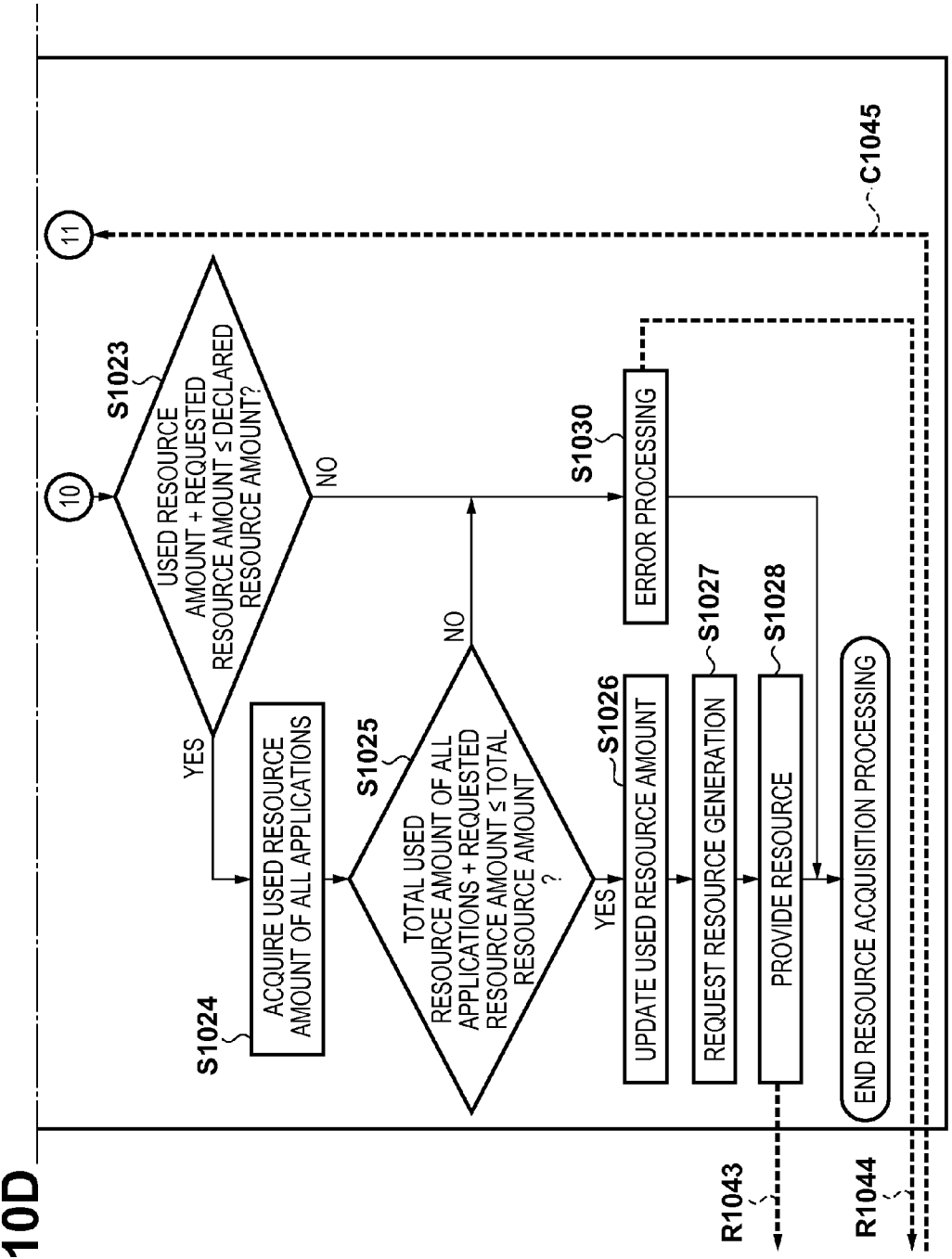

In the case of Java, a request for a resource can be made by generating (an instance of) the requested resource object, for example. More specifically, the instance of the object for a necessary resource is generated by using the service API unit of the resource service in S1002. By the constructor of the resource object being called, the resource management unit 605 and the application platform, the Java VM, or the like generate the resource object as shown in FIGS. 10C and 10D. The resource object that is generated is an object defined to wrap the Java standard class, as shown in FIGS. 5A and 5B. Therefore, the obtained resource may be handled in a similar manner to a normal resource in Java. For example, when the application platform is requested to generate a resource, the application platform secures the resource and returns information for specifying the secured resource to the application that made the request. Of course, this is merely an example. There are also cases where information for specifying the resource is given as a parameter of the resource request. The release of a resource, for example, calls a delete method in the case of the Java file object shown in FIGS. 5A and 5B, and calls a close method in the case of the file input stream object, the file output stream object, or the socket object shown in FIGS. 5A and 5B. The thread object need not particularly request release.

Resource Management at the Time of Resource Use

Figure 11:
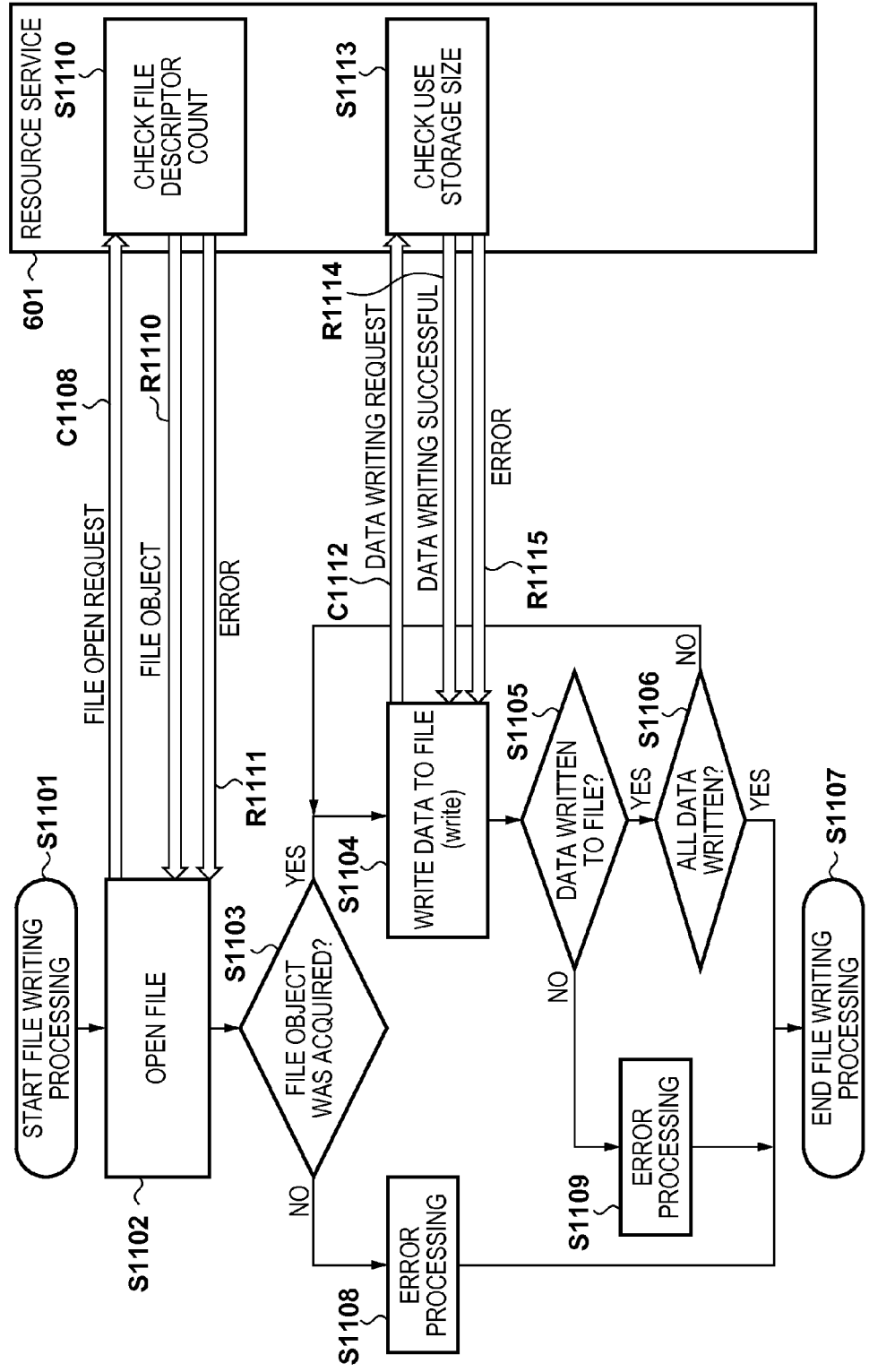
FIG. 11 is a flowchart of file writing by an application.

FIG. 11 shows processing by an application and the resource service 601 at the time of file writing. Note that writing to a file consumes a resource each time writing is performed. Therefore, it is necessary to determine whether the total resource use amount exceeds a predetermined upper limit when writing is performed, rather than when resource request is made, as shown in FIGS. 10A to 10D. Determination and updating of the use resource amount when writing is performed on the file are executed using the procedure shown in FIG. 11.

The application starts file writing processing (S1101). First, the application issues a file open request to the resource service (S1102). The resource service 601, having received the file open request C1108, determines whether the file can be opened based on the used amount of the file descriptor and the declared amount of the file descriptor of the application (S1110). If the file can be opened, the resource service 601 returns the file object to the application 608 (R1110). If the file cannot be opened, the resource service 601 returns an error to the application 608 (R1111). The procedure for acquiring the file resource is as described in FIGS. 10A to 10D.

The application determines whether the file object was acquired from the resource service (S1103), and if the file object was acquired, the processing transitions to S1104. If the file object was not acquired, the processing transitions to S1108, and the application performs error processing and ends the file writing processing (S1107). In the case where the file object is acquired, the application issues a request to the resource service 601 to write data to the file (S1104). The resource service 601 that has received the data writing request C1112 from the application 608 determines whether file writing is possible based on the used amount to the storage and the declared amount of the storage of the application (S1113). If file writing is possible, the resource service 601 writes data to the file, and returns a notification of success in data writing to the application (R1114). If writing file is impossible, the resource service 601 returns an error to the application (R1115).

The application determines whether the resource service 601 can perform file writing (S1105), and if the resource service 601 can perform writing, the processing transitions to S1106. If the resource service 601 can not perform writing, the processing transitions to S1109, and the application performs error processing and then ends the file writing processing (S1107). The application determines whether all data to be written has been written (S1106). If all data has been written, the processing transitions to S1107, and the application ends the file writing processing. If all data has not been written, the processing transitions to S1104, and the application continues the file writing processing. The use amount of the file resource is also reflected in the resource amount storage unit 603 using the procedure shown in FIG. 11 at the time of file writing by steps S1104 and S1113 in particular.

As described above, in Java, the function of the resource service is provided via the service API unit, and the API unit is specified by the class and method shown in FIGS. 5A and 5B, for example. For example, in order to obtain a file resource in S1102, the getFile method in the ResourceService class is called so that the resource service generates a resource object of the file, that is, the instance of the RSFile class. This is as shown in the procedure of FIGS. 10A to 10D. Also when data is written to the file, the instance of the RSFileOutputStream class of FIG. 5B is generated first, for example. In FIG. 11, the instance of the RSFileOutputStream class is generated immediately after it is determined to be YES in S1103, using the file object generated in S1102 as the parameter. Accordingly, the object of the RSFileOutputStream class that is generated is associated with output stream of the generated file object. Writing is then performed by calling the write method of the object of the generated RSFileOutputStream class in S1104. It is determined in S1113 whether the use amount exceeds the upper limit based on the size of a storage to which data is to be written at this time, with reference to the resource amount storage unit 603. Similarly to FIGS. 10C and 10D, determination as to whether the used amount exceeds the upper limit is made by comparing the storage size used by all applications with not only the upper limit of the declared amount of the storage declared by the application (application that uses the service) that will perform file writing but also with the upper limit of the storage size that can be provided by the image forming apparatus 100. Also, when writing is performed, the storage use amount of the resource amount storage unit 603 is updated.

As described above, in the present embodiment, it is possible to check for each application whether the resource use amount exceeds the upper limit when acquiring a resource, when releasing a resource, and when writing to a file resource. Furthermore, resource management can be performed by an external application, referred to as a resource service, executed on the platform, thus improving the ease and flexibility of resource management. Moreover, even if an application is not compatible with the resource service, the application can use resources provided by the application platform as in the past.

Embodiment 2

Because the resource service 601 of Embodiment 1 is an application that operates on the application platform 205, a user can instruct the application platform 205 to stop the resource service 601, using the PC 209. When the resource service 601 stops, the function that the resource service provides to the application can also no longer be used, and therefore the application that uses the resource service to acquire and utilize the resource cannot operate. The resource service of Embodiment 2 is a resource service that can continue the operation of the application even when the resource service is stopped.

Figure 12:
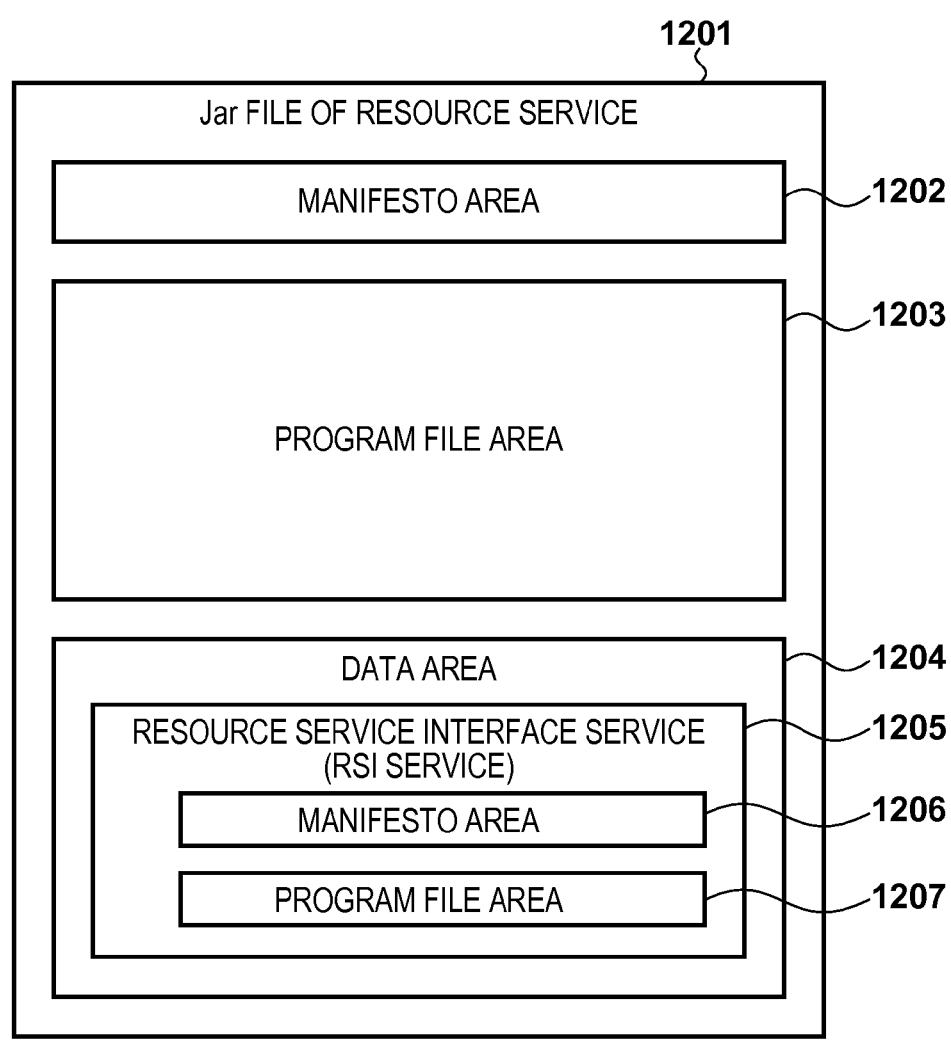
FIG. 12 is a diagram showing the structure of a Jar file holding a program of a resource service of Embodiment 2.

FIG. 12 shows the structure of a Jar file 1201 holding a program of the resource service of Embodiment 2. The Jar file 1201 of the resource service is configured by a manifesto area 1202 holding setting information for the resource service, a program file area 1203 holding a program code, and a data area 1204 holding data used by the resource service. Furthermore, the data area 1204 of the resource service holds a Jar file 1205 holding a program of a resource service interface service (RSI service, hereinafter) as one set of data. The Jar file 1205 of the RSI service is configured by the manifesto area 1206 holding settings for the RSI service and a program file area 1207 holding the program code of the RSI service. The RSI service is an application that excludes the resource management function from the resource service.

FIG. 14 shows a comparison of functions between the resource service of Embodiment 1 and the RSI service of Embodiment 2. Both the resource service and the RSI service have a service API unit that provides an API for the application to acquire a resource. The resource service has a resource management function, whereas the RSI service does not have a resource management function. Both the resource service and the RSI service have a resource generation function for generating resources. The RSI service has a resource service registration interface for registering the resource service therein, whereas the RSI service does not have a resource service. Because the RSI service does not have the resource management function, the program size of the RSI service is significantly smaller as compared to that of the resource service. Because the RSI service does not have a resource management function, the amount of resources to be used such as memory is significantly smaller as compared to that of the resource service. The resource service is installed by the application platform, whereas the RSI service is installed by the resource service.

Although the resource service is uninstalled by the application platform 205, the RSI service cannot be uninstalled.

Resource Service Activation Procedure of this Embodiment

Figure 13A:
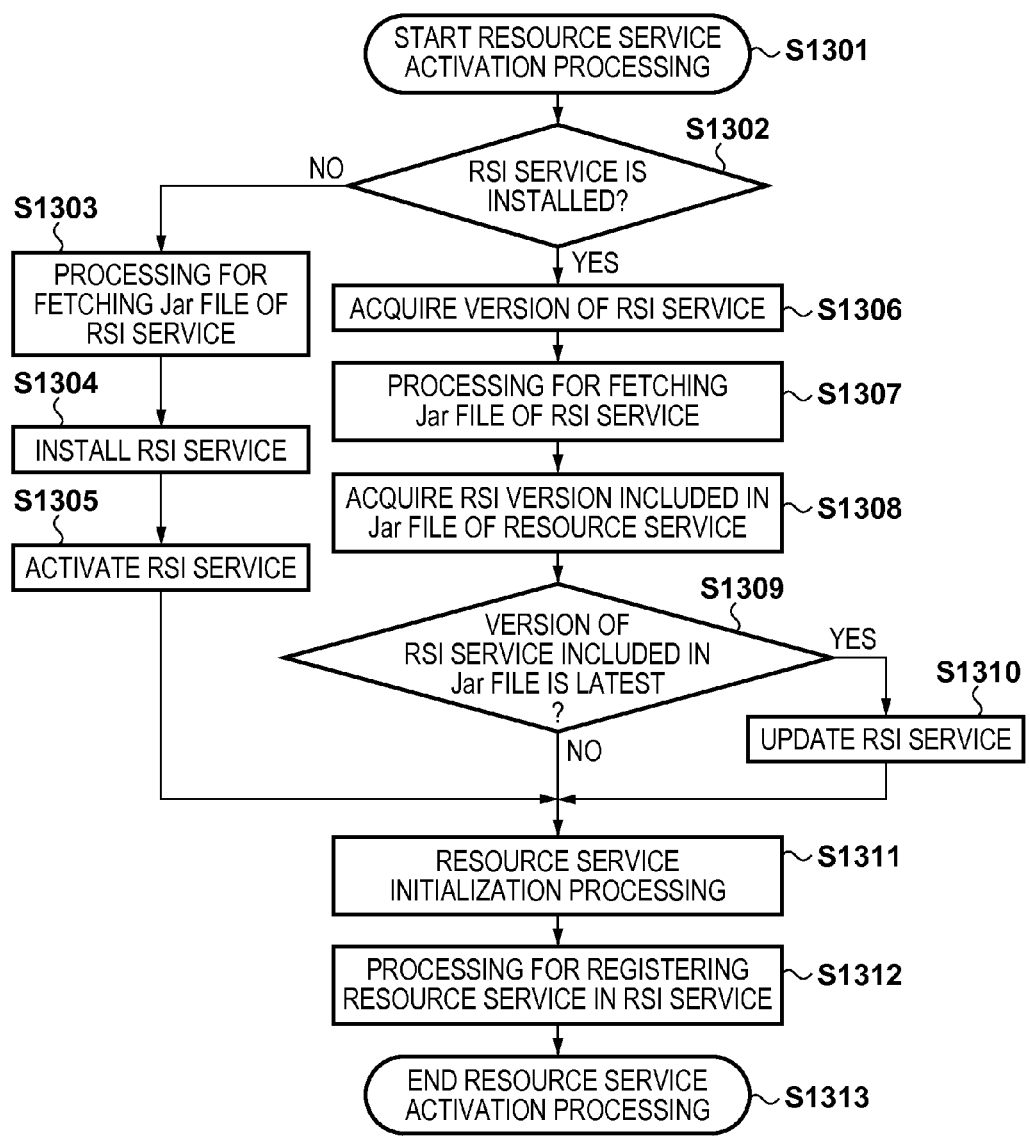
FIG. 13A is a flowchart of processing for activating resource service of Embodiment 2.
Figure 13B:
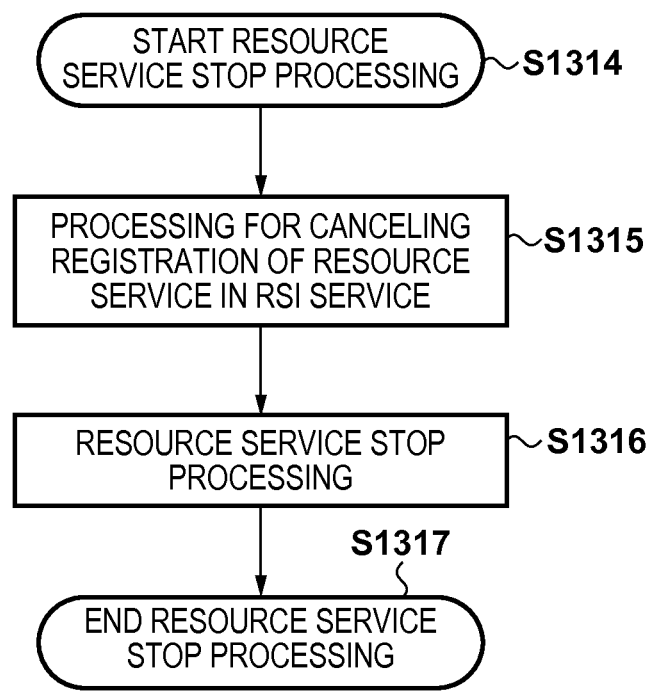
FIG. 13B is a flowchart of processing for stopping resource service of Embodiment 2.

FIG. 13A is a flowchart of processing when the resource service of Embodiment 2 is activated and FIG. 13B is a flowchart of processing when the resource service of Embodiment 2 is stopped by the application platform 205. Upon receiving an activation instruction from the application platform 205, the resource service starts activation processing (S1301).

The resource service checks whether the RSI service is installed in the application platform 205 (S1302). If the RSI service is not installed, the processing transitions to S1303. If the RSI service is installed, the processing transitions to S1306. In S1303, the resource service fetches a Jar file 1205 of the RSI service from the Jar file 1201 of the resource service (S1303). The resource service installs the Jar file 1205 of the RSI service fetched in S1303 in the application platform (S1304). Furthermore, the resource service issues an instruction to the application platform to activate the RSI service (S1305), and the processing transitions to S1311.

In S1306, the resource service acquires the version of the RSI service installed (S1306). Next, the resource service fetches the Jar file 1205 of the RSI service from the Jar file 1201 of the resource service (S1307). The resource service acquires the version of the RSI service from a manifesto area 1206 of the Jar file of the RSI service acquired in S1307 (S1308). If the version of the RSI service acquired in S1308 is newer than the version of the RSI service acquired in S1306, the processing transitions to S1310, whereas if the version of the RSI service acquired in S1308 is not newer than the version of the RSI service acquired in S1306, the processing transitions to S1311.

The resource service, in S1310, updates the RSI service (S1310) and installs in the application platform 205 using the Jar file of the RSI service acquired in S1307, and the processing transitions to S1311. In S1311, the resource service executes processing for initializing itself (S1311). Next, the resource service performs processing for registering the resource service in the RSI service (S1312), and ends the processing for activating the resource service (S1313).

Upon receiving a stop instruction from the application platform 205, the resource service starts stop processing (S1314). Next, processing for releasing registration of the resource service registered in the RSI service is performed (S1315). Furthermore, the resource service executes processing for stopping itself (S1316), and ends the stop processing (S1317). In the resource service stop processing in steps S1314 to S1317, the RSI service stop processing is not performed, and thus even if the resource service is stopped or uninstalled, the RSI service is not stopped or uninstalled.

Configuration of Resource Service

Figure 15B:
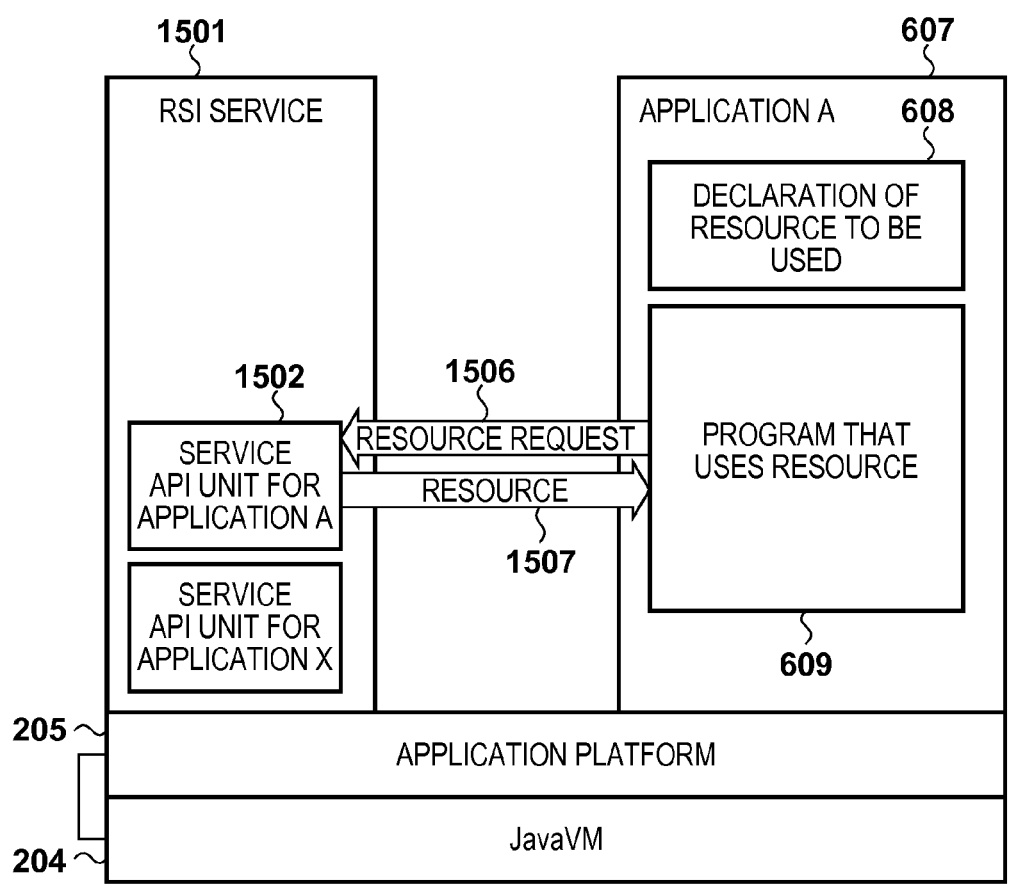
FIG. 15B is a diagram of the software configuration of the resource service of Embodiment 2.

FIG. 15A shows the system configuration when the resource service 601 and the RSI service 1501 are activated in the present example, and FIG. 15B shows the system configuration when the resource service 601 is stopped and only the RSI service 1501 is activated. In the case where the resource service 601 is activated, the RSI service has a resource service reference 1508 registered in S1313 of the resource service activation processing. A resource acquisition and usage request 1503 issued from the application 607 to the RSI service 1501 is transferred to the resource service 601 identified by the resource service reference 1508, and the resource service 601 executes acquisition and usage of the resource. The resource management performed by the resource service is executed in the same manner as in FIGS. 10A to 10D and 11 of Embodiment 1.

On the other hand, in the case where the resource service 601 is not activated, the RSI service 1501 acquires and uses resources. Accordingly, the resource service correspondence application can issue a resource request and use the resource, using the same service API, regardless of whether or not the resource service is operating.

Sequence of Resource Acquisition Processing

FIG. 16 shows the sequence of the resource acquisition processing when the resource service 601 is activated and when the resource service 601 is not activated. The RSI service 1501 registers itself in the service API management unit 302 of the application platform 205 at the time of activation.

The application 607 uses the application platform 205 to issue a service API unit acquisition request to the RSI service 1501 (1601). The RSI service 1501 generates the service API unit of the resource service, and returns the service API unit of the resource service to the application 607 (1603).

In the case where the resource service is activated, the application 607 issues a resource acquisition and usage request to the service API unit 1502 of the resource service (1503). The service API unit 1502 of the resource service transfers the request made in S1604 to the RSI service 1501 (1605).

The RSI service 1501 transfers the request made in S1605 to the resource service 601 registered in the resource service reference (1508) (1606). The resource service 601 performs resource management processing and resource generation and usage processing (1607), and returns the processing to the RSI service 1501 (S1608). The RSI service 1501 returns the processing to the service API unit 1502 of the resource service (1609). The service API unit 1502 of the resource service returns the processing to the application 607 (1610).

On the other hand, if the resource service is not activated, the resource service is not registered in the resource service reference (1508). The application 607 also issues the resource acquisition and usage request to the service API unit 1502 of the resource service in this case (1611). The service API unit 1502 of the resource service transfers the request made in 1611 to the RSI service 1501 (1612).

The RSI service 1501 uses Java standard resource generation and the usage API to perform the resource generation and usage processing (1613), and returns the processing to the service API unit 1502 of the resource service (1614). The service API unit 1502 of the resource service returns the processing to the application 607 (1615).

According to the above-described configuration and procedure, once executed, the RSI service 1501 operates without stopping, and if the resource service is operating, the RSI service 1501 redirects requests to the resource service. Therefore, the RSI service correspondence application can acquire and use a resource via the service API of the RSI service regardless of whether or not the resource service is being executed.

Embodiment 3

The resource service of Embodiment 2 can execute the resource service correspondence application even if the resource service stops. However, in the case where the resource service is activated later, the resource service cannot manage the resource acquired by the application until the resource service is activated. The RSI service of the resource service of Embodiment 3 is an RSI service that only measures use resources when the RSI service is activated and the resource service is not activated.

FIG. 17 is a table 1701 storing resource use amounts held by the RSI service of the resource service 601 of Embodiment 3. The table stores an application identifier 1702 and a resource amount 1703 used by the application.

Figure 18:
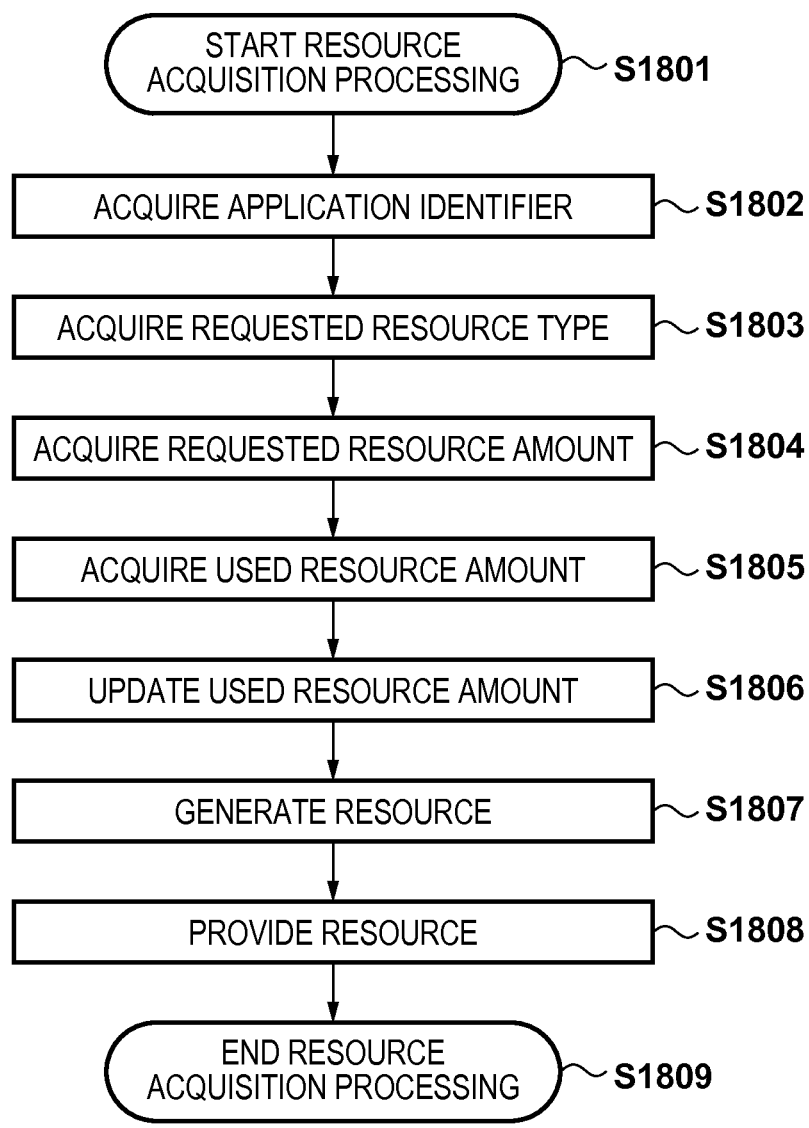
FIG. 18 is a flowchart for the RSI service of Embodiment 3 to acquire a resource.

FIG. 18 is a diagram showing the processing in the case where a resource request is issued from the API unit 1502 of the resource service to the RSI service 1501. Upon receiving the resource request from the API unit 1502 of the resource service, the RSI service 1501 starts resource acquisition processing (S1801). The RSI service 1501 acquires the identifier of the application that will use the resource from the resource request made by the API unit 1502 of the resource service (S1802). Next, the type of the requested resource is acquired (S1803). Furthermore, the amount of the requested resource is acquired (S1804). Next, the RSI service 1501 acquires a used amount 1703 of the resource type acquired in S1803 used by the application that is identified by the application identifier acquired in S1802 from the table 1701 storing the used resource amount (S1805). Furthermore, the RSI service 1501 adds the requested resource amount acquired in S1804 to the used resource amount 1703 of the resource type acquired in S1803 used by the application of the table 1701 that is identified by the application identifier acquired in S1802, and updates the used resource amount (S1806). Next, the RSI service 1501 generates a resource requested by the API unit 1502 of the resource service using the Java standard API (S1807). When the resource is generated, the RSI service 1501 returns the requested resource to the API unit 1502 of the resource service in S1028 (S1808), and ends the resource acquisition processing (S1809).

Resource Service Activation Processing

Figure 19B:
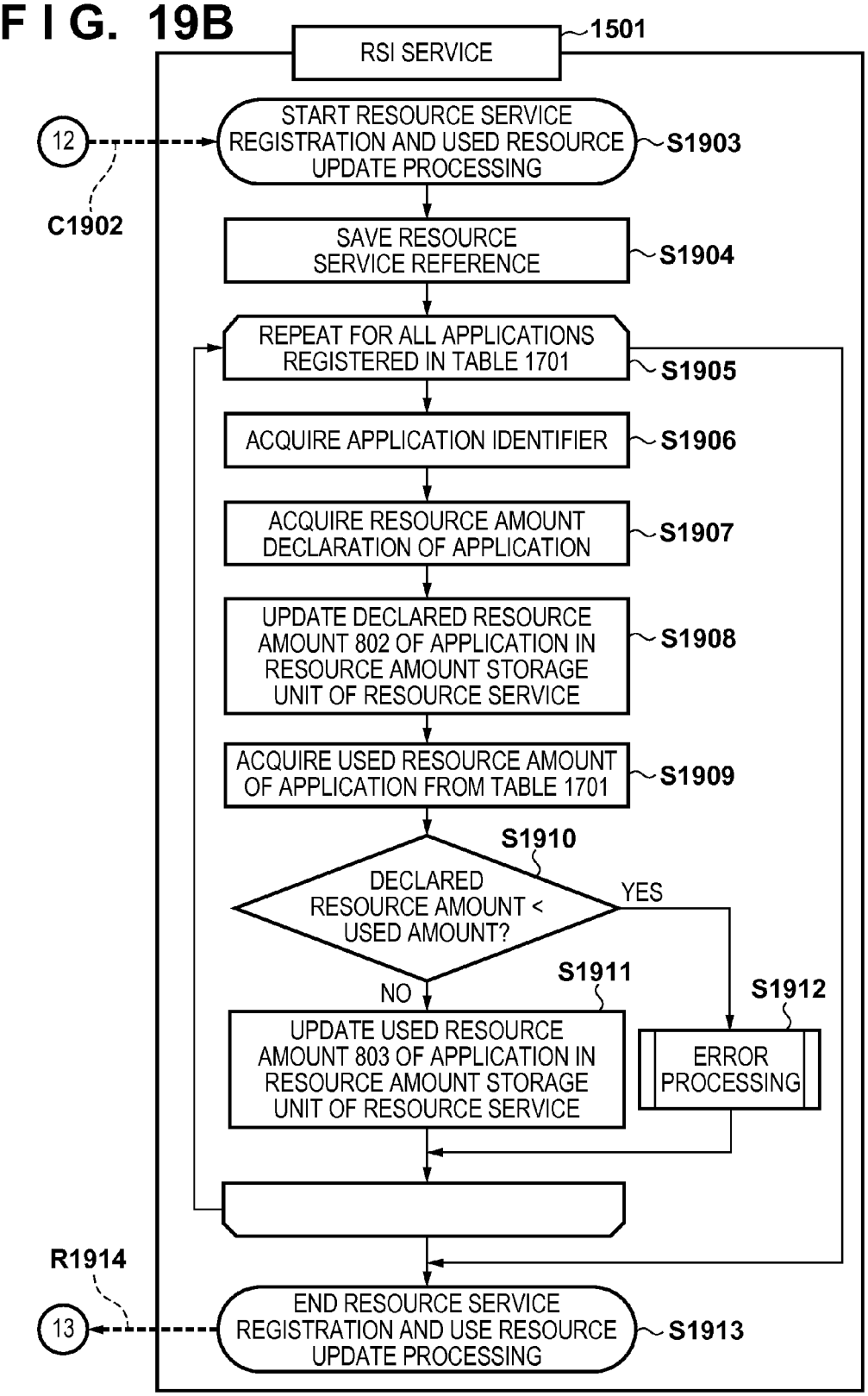
FIG. 19B is a flowchart of resource service registration by the RSI service.

FIG. 19A is a flowchart of resource service registration processing for updating the resource amount storage unit 603 of the resource service 601 that are performed when the resource service 601 is activated in a state in which the RSI service 1501 is activated. FIG. 19B is a flowchart of resource service registration processing by the RSI service 1501. When an instruction is issued by the application platform 206 to activate the resource service 601, the resource service 601 starts activation processing (S1301). Next, the resource service 601 performs initialization processing (S1902). S1902 includes the processing of S1302 to S1311. Next, the resource service 601 issues a resource service registration request (C1902) for the RSI service 1501 (S1312), and ends the resource service activation processing (S1313).

Upon receiving the resource service registration request (C1902), the RSI service 1501 starts the resource service registration processing and the processing for updating the resource amount storage unit 603 (S1903). First, reference of the resource service 601 is stored (S1904). Next, the processing of S1906 to S1912 is repeated for all applications registered in the table 1701 that stores the resource use amount and is held by the RSI service 1501 (S1905).

The RSI service 1501 first acquires one record from the table, and acquires the application identifier (1702) of the record (S1906). Next, the RSI service 1501 acquires a resource amount declaration 608 of the application whose identifier is acquired in S1906 (S1907). Next, the RSI service 1501 updates the declared resource amount 802, which is stored in the resource amount storage unit 603, of the record of the application whose identifier is acquired in S1906 to the resource amount declaration 608 acquired in S1907 (S1908). The RSI service 1501 acquires the used resource amount 1703 of the application whose identifier is acquired in S1906 from the table 1701 (S1909). The declared resource amount value 608 acquired in S1907 is compared to the used resource amount 1703 acquired in S1909 (S1910). In the case where the used amount is greater than the declared amount, error processing (S1912) is performed, and the processing returns to S1905. If the used amount is less than or equal to the declared amount, the used resource amount 803, which is stored in the resource storage unit of the resource service, of the application whose identifier is acquired in S1906 is updated to the used resource amount 1703 acquired in S1909 (S1911), and the processing returns to S1905.

In the error processing of S1912, the application may be stopped, or excess resources that are used may be forcibly released.

When the processing for all applications registered in the table 1701 ends in S1905, the RSI service 1501 ends the resource service registration processing and the processing for updating the resource amount storage unit 603 (S1913) and returns the processing to the resource service 601 (R1914).

As a result of the above-described configuration and procedure, in the present embodiment, even if the resource service is not operating, the use amount of resources for each application is managed using the RSI service. Furthermore, when the resource service is started or resumed, the resource use amount of the application managed by the RSI service is compared to the upper limit of the resource declared by each application, and it is determined whether the resource use amount exceeds the upper limit. Moreover, by updating the resource amount storage unit 603, it is possible to manage consumption of resources while the resource service is interrupted.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-163049, filed Aug. 8, 2014 which is hereby incorporated by reference herein in its entirety.

What is claimed is:
1. An image forming apparatus comprising:
at least one processor and at least one memory coupled to the at least one processor, the at least one memory having instructions stored thereon, which, when executed by the at least one processor, cause the image forming apparatus to:

receive a declared resource amount to be used from each of applications installed on an application platform;

hold a plurality of declared resource amounts received from the applications for each application; and in response to a resource acquisition application programming interface (API) being called from an application that initiates a process using a resource, determine whether or not a sum of a resource amount used by the application which has called the resource acquisition API and a resource amount requested by the application exceeds the declared resource amount held for the corresponding application, issue a notification that the resource amount exceeds the declared resource amount to the application as a response from the acquisition API, in a case where it is determined that the resource amount exceeds the declared resource amount, and issue a request to the application platform to generate a resource and deliver a resource object generated in response to the request as a response from the acquisition API, in a case where it is determined that the resource amount does not exceed the declared resource amount.

2. The image forming apparatus according to claim 1, wherein the instructions, when executed by the at least one processor, further cause the image forming apparatus to:

manage a resource use amount of the applications for each type of resource in association with the declared declaration amount, determine whether or not the sum of the resource amount used by the application and the resource amount requested by the application exceeds the declared resource amount with respect to the type of resource corresponding to the resource acquisition application programming interface that was called, and in a case of delivering the resource object, add a resource amount consumed by the resource generation to the used resource amount.

3. The image forming apparatus according to claim 1, wherein the instructions, when executed by the at least one processor, further cause the image forming apparatus to:

in response to the resource acquisition application programming interface being called, determine whether or not the sum of a total resource amount used by the applications and the resource amount requested by the application exceeds an upper limit of a resource amount that can be provided by the application platform, and, in a case where it is determined that the total resource amount used by the applications exceeds the upper limit of the resource amount that can be provided by the application platform, issue a notification that the total resource amount exceeds the upper limit of the resource amount to the application.

4. The image forming apparatus according to claim 2, wherein the instructions, when executed by the at least one processor, further cause the image forming apparatus to:

in response to resource release processing by the application, further release a designated resource and subtract an amount of the released resource from the used resource amount held for the corresponding application.

5. The image forming apparatus according to claim 1, wherein the instructions, when executed by the at least one processor, further cause the image forming apparatus to:

register a reference to the resource in a case where the resource is being used;

cancel registration of the reference in a case where use of the resource is stopped; and in response to the resource acquisition API being called from the application, redirect the call of the resource acquisition API from the application to the resource if the reference to the resource is registered, and issue a request to the application platform to generate a resource and delivers a resource object generated in response to the request if registration of the reference to the resource is cancelled.

6. The image forming apparatus according to claim 5, wherein the instructions, when executed by the at least one processor, further cause the image forming apparatus to:

hold a total use amount of a resource used by the generated resource object for each application, if the reference to the resource is cancelled;

determine, when the resource is being used, whether or not the sum of the total resource amount used by the applications and the total use amount of the held resource exceeds the declared resource amount; and in a case where it is determined that the use amount of a current resource exceeds the declared resource amount, issue a notification that the use amount of the resource exceeds the declared resource amount to the application.

7. The image forming apparatus according to claim 5, wherein the instructions, when executed by the at least one processor, further cause the image forming apparatus to:

install a program, which, when executed by the at least one processor, further causes the image forming apparatus to realize the steps of:

registering a reference to the resource in a case where the resource is being used;

cancelling registration of the reference in a case where use of the resource is stopped; and in response to the resource acquisition API being called from the application, redirecting the call of the resource acquisition API from the application to the resource if the reference to the resource is registered, and issuing a request to the application platform to generate a resource and delivers a resource object generated in response to the request if registration of the reference to the resource is cancelled;

wherein the program is installed when a program is installed, which when executed by the at least one processor, causes the imaging forming apparatus to realize the steps of:

in response to a resource acquisition application programming interface (API) being called from an application that initiates a process using a resource, determining whether or not a sum of a resource amount used by the application which has called the resource acquisition API and a resource amount requested by the application exceeds the declared resource amount held for the corresponding application, issuing a notification that the resource amount exceeds the declared resource amount to the application as a response from the acquisition API, in a case where it is determined that the resource amount exceeds the declared resource amount, and issuing a request to the application platform to generate a resource and deliver a resource object generated in response to the request as a response from the acquisition API, in a case where it is determined that the resource amount does not exceed the declared resource amount.

8. The image forming apparatus according to claim 7, wherein the instructions, when executed by the at least one processor, further cause the image forming apparatus to:
install a latest program, which, when executed by the at least one processor, further causes the image forming apparatus to realize the steps of:
registering a reference to the resource in a case where the resource is being used;
cancelling registration of the reference in a case where use of the resource is stopped; and
in response to the resource acquisition API being called from the application, redirecting the call of the resource acquisition API from the application to the resource if the reference to the resource is registered, and issuing a request to the application platform to generate a resource and delivers a resource object generated in response to the request if registration of the reference to the resource is cancelled;
wherein the latest program is installed when the program is installed, which when executed by the at least one processor, causes the imaging forming apparatus to realize the steps of:
in response to a resource acquisition application programming interface (API) being called from an application that initiates a process using a resource, determining whether or not a sum of a resource amount used by the application which has called the resource acquisition API and a resource amount requested by the application exceeds the declared resource amount held for the corresponding application, issuing a notification that the resource amount exceeds the declared resource amount to the application as a response from the acquisition API, in a case where it is determined that the resource amount exceeds the declared resource amount, and issuing a request to the application platform to generate a resource and deliver a resource object generated in response to the request as a response from the acquisition API, in a case where it is determined that the resource amount does not exceed the declared resource amount.

9. The image forming apparatus according to claim 1, wherein the resource is at least one of a file resource, a socket resource, or a thread resource.

10. A non-transitory computer-readable medium storing a program for causing a computer to function as:
a reception unit that receives a declared resource amount to be used from each of applications installed on an application platform;
a holding unit that holds a plurality of declared resource amounts received from the applications for each application; and
a resource management unit that, in response to a resource acquisition application programming interface (API) being called from an application that initiates a process using a resource, determines whether or not a sum of a resource amount used by the application which has called the resource acquisition API and a resource amount requested by the application exceeds the declared resource amount held for the corresponding application, issues a notification that the resource amount exceeds the declared resource amount to the application as a response from the acquisition API, in a case where it is determined that the resource amount exceeds the declared resource amount, and issues a request to the application platform to generate a resource and delivers a resource object generated in response to the request as a response from the acquisition API, in a case where it is determined that the resource amount does not exceed the declared resource amount.

11. A resource management method comprising:
receiving a use resource declaration amount from each of applications installed on an application platform;
holding a plurality of declared resource amounts received from the applications for each application; and
in response to a resource acquisition application programming interface (API) being called from an application that initiates a process using a resource, determining whether or not a sum of a resource amount used by the application which has called the resource acquisition API and a resource amount requested by the application exceeds the held declared resource amount corresponding to the application, issues a notification that the resource amount exceeds the declared resource amount to the application as a response from the acquisition API, in a case where it is determined that the resource amount exceeds the declared resource amount, and issues a request to the application platform to generate a resource and delivers a resource object generated in response to the request as a response from the acquisition API, in a case where it is determined that the resource amount does not exceed the declared resource amount.

* * * * *